United States Patent
Kume et al.

(10) Patent No.: US 7,391,489 B2
(45) Date of Patent: Jun. 24, 2008

(54) LIQUID CRYSTAL DISPLAY DEVICE

(75) Inventors: Yasuhiro Kume, Kawachinagano (JP); Kazuhiko Tamai, Nabari (JP); Noriaki Onishi, Nara (JP)

(73) Assignee: Sharp Kabushiki Kaishia, Osaka (JP)

( * ) Notice: Subject to any disclaimer, the term of this patent is extended or adjusted under 35 U.S.C. 154(b) by 459 days.

(21) Appl. No.: 11/073,945

(22) Filed: Mar. 8, 2005

(65) Prior Publication Data
US 2005/0200784 A1    Sep. 15, 2005

(30) Foreign Application Priority Data
Mar. 9, 2004   (JP)   ............... 2004-066292
Mar. 23, 2004  (JP)   ............... 2004-084404

(51) Int. Cl.
G02F 1/1337    (2006.01)
G02F 1/1335    (2006.01)
G02F 1/1339    (2006.01)

(52) U.S. Cl. .................. 349/129; 349/114; 349/156

(58) Field of Classification Search ................ 349/114, 349/156, 117, 129
See application file for complete search history.

(56) References Cited

U.S. PATENT DOCUMENTS

| | | | |
|---|---|---|---|
| 5,627,665 A * | 5/1997 | Yamada et al. ............ 349/156 |
| 5,666,179 A | 9/1997 | Koma |
| 6,115,098 A | 9/2000 | Kume et al. |
| 6,195,140 B1 | 2/2001 | Kubo et al. |
| 6,317,187 B1 | 11/2001 | Nakajima et al. |
| 6,339,462 B1 | 1/2002 | Kishimoto et al. |
| 6,384,889 B1 | 5/2002 | Miyachi et al. |
| 6,661,488 B1 | 12/2003 | Takeda et al. |
| 6,690,441 B2 * | 2/2004 | Moriya ........................ 349/130 |
| 6,753,939 B2 | 6/2004 | Jisaki et al. |
| 6,762,818 B2 | 7/2004 | Yamada |
| 6,774,974 B1 * | 8/2004 | Matsuyama ................ 349/155 |

(Continued)

FOREIGN PATENT DOCUMENTS

JP    09-090426    4/1997

(Continued)

OTHER PUBLICATIONS

U.S. Appl. No. 10/952,480, filed Sep. 29, 2004.

(Continued)

*Primary Examiner*—James A Dudek
(74) *Attorney, Agent, or Firm*—Nixon & Vanderhye P.C.

(57) ABSTRACT

The liquid crystal display device of the present invention includes a first substrate, a second substrate and a vertically aligned liquid crystal layer interposed between the first and second substrate. The device has a plurality of pixels each including a first electrode formed on the first substrate, a second electrode formed on the second substrate, and the liquid crystal layer interposed between the first and second electrode, and a shading region provided around the pixels. A plurality of supports for defining the thickness of the liquid crystal layer are placed regularly on the surface of the first or second substrate facing the liquid crystal layer in the shading region. The liquid crystal layer forms at least one liquid crystal domain exhibiting axisymmetric alignment when at least a predetermined voltage is applied, and the tilt direction of liquid crystal molecules in the at least one liquid crystal domain is defined with inclined sides of the plurality of supports.

11 Claims, 12 Drawing Sheets

U.S. PATENT DOCUMENTS

| | | | |
|---|---|---|---|
| 7,206,057 B2* | 4/2007 | Yoo et al. | 349/156 |
| 7,253,872 B2* | 8/2007 | Kume et al. | 349/191 |
| 2001/0006410 A1 | 7/2001 | Yamada et al. | |
| 2001/0026347 A1 | 10/2001 | Sawasaki et al. | |
| 2002/0039166 A1* | 4/2002 | Song | 349/156 |
| 2002/0080320 A1 | 6/2002 | Suzuki et al. | |
| 2002/0149728 A1 | 10/2002 | Ogishima et al. | |
| 2003/0224255 A1 | 12/2003 | Fujimorni | |
| 2006/0203178 A1* | 9/2006 | Cho et al. | 349/156 |

FOREIGN PATENT DOCUMENTS

| | | |
|---|---|---|
| JP | 2000-206534 A | 7/2000 |
| JP | 2001-337332 | 12/2001 |
| JP | 2002-357832 A | 12/2002 |
| KR | 2003-0058012 A | 7/2003 |

OTHER PUBLICATIONS

U.S. Appl. No. 10/980,867, filed Nov. 4, 2004.
U.S. Appl. No. 11/005,322, filed Dec. 7, 2004.
U.S. Appl. No. 11/019,635, filed Dec. 23, 2004.
U.S. Appl. No. 11/061,601, filed Feb. 22, 2005.

* cited by examiner

Transmission Region A | Reflection Region B

Transmission Region A | Reflection Region B

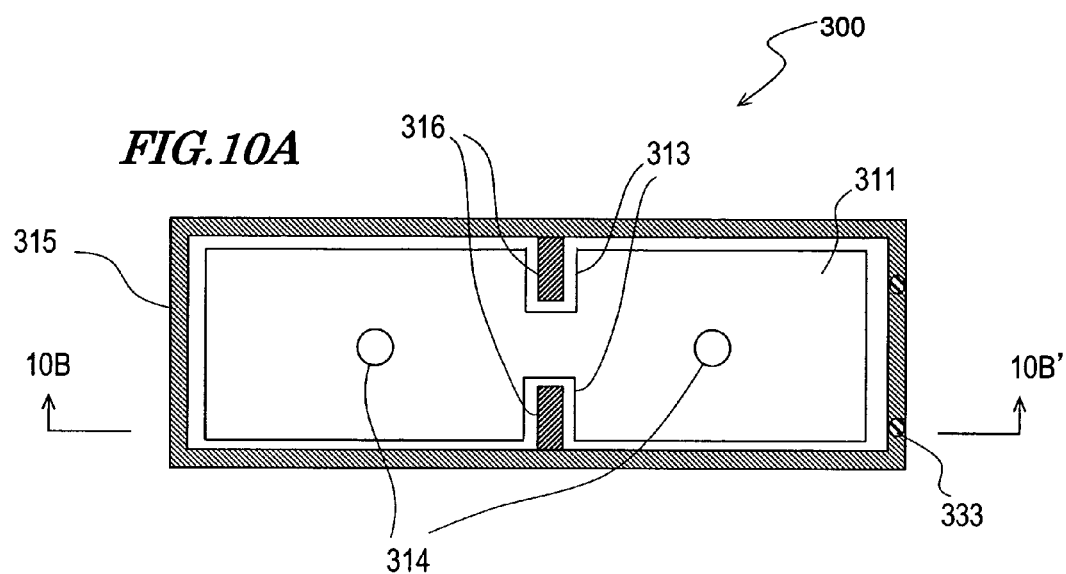
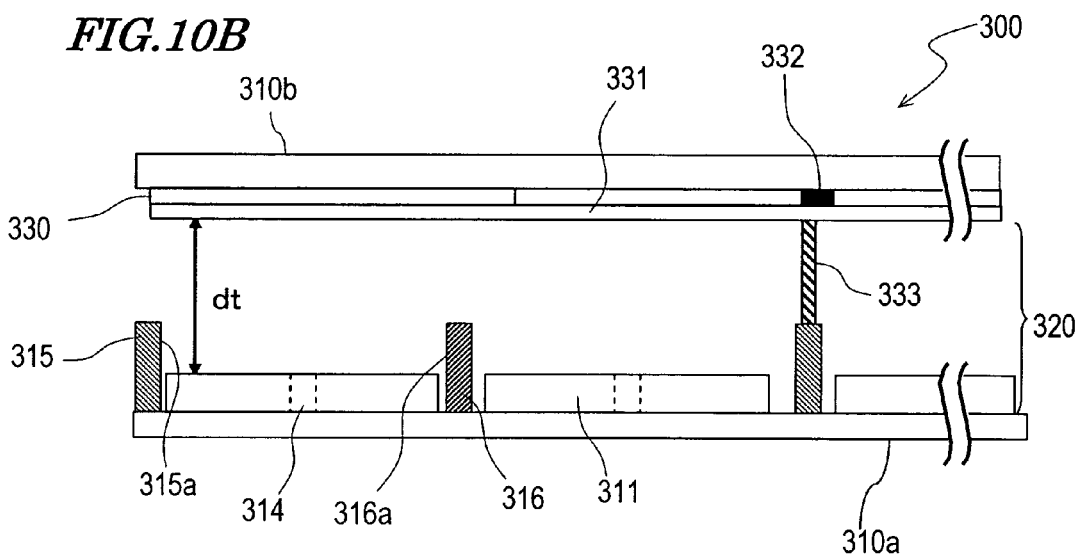

LIQUID CRYSTAL DISPLAY DEVICE

BACKGROUND OF THE INVENTION

1. Field of the Invention

The present invention relates to a liquid crystal display device and more particularly relates to a liquid crystal display device suitably used for portable information terminals (for example, PDAs), mobile phones, car-mounted liquid crystal displays, digital cameras, PCs, amusement equipment, TVs and the like.

2. Description of the Related Art

The information infrastructure is advancing day to day, and equipment such as mobile phones, PDAs, digital cameras, video cameras and car navigators has penetrated deeply into people's lives. Liquid crystal display (LCD) devices have been adopted in most of such equipment. With increase of the information amount handled with the main bodies of the equipment, LCD devices are requested to display a larger amount of information, and are demanded by the market for higher contrast, a wider viewing angle, higher brightness, multiple colors and higher definition.

A vertical alignment mode using a vertically aligned liquid crystal layer has increasingly received attention as a display mode enabling high contrast and a wide viewing angle. The vertically aligned liquid crystal layer is generally obtained using a vertical alignment film and a liquid crystal material having negative dielectric anisotropy.

For example, Japanese Laid-Open Patent Publication No. 6-301036 (Literature 1) discloses an LCD device in which an inclined electric field is generated around an opening formed in a counter electrode that faces a pixel electrode via a liquid crystal layer, so that liquid crystal molecules surrounding liquid crystal molecules existing in the opening, which are in the vertically aligned state, are aligned in inclined directions around the opening as the center, to thereby improve the visual angle characteristics.

However, in the device described in Literature 1, it is difficult to generate an inclined electric field over the entire region of each pixel. Therefore, each pixel has a region in which liquid crystal molecules delay in response to a voltage, and this causes a problem of occurrence of an afterimage phenomenon.

To solve the above problem, Japanese Laid-Open Patent Publication No. 2000-47217 (Literature 2) discloses an LCD device in which a plurality of openings are provided regularly in a pixel electrode or a counter electrode, to form a plurality of liquid crystal domains each having axisymmetric alignment in each pixel.

Japanese Laid-Open Patent Publication No. 2003-167253 (Literature 3) discloses a technology in which a plurality of projections are provided regularly in each pixel to stabilize the aligned state of liquid crystal domains having radially inclined alignment formed around the projections. This literature also discloses using an inclined electric field generated at openings formed in an electrode, together with the alignment regulating force of the projections, to regulate the alignment of liquid crystal molecules, and thus improve the display characteristics.

Japanese Laid-Open Patent Publication No. 2001-337332 (Literature 4) discloses a multi-domain vertically aligned LCD device in which wall spacers having inclined sides are provided to define the directions of tilt of liquid crystal molecules using the alignment regulating force of the inclined sides. This technology eliminates the necessity of performing an additional step for providing an alignment regulating structure and also can suppress a variation in inter-substrate spacing (thickness of the liquid crystal layer) even for large-screen devices.

In recent years, a type of LCD device providing high-quality display both outdoors and indoors has been proposed (see Japanese Patent Gazette No. 2955277 (Literature 5) and U.S. Pat. No. 6,195,140 (Literature 6), for example). In this type of LCD device, called a transflective LCD device, each pixel has a reflection region in which display is done in the reflection mode and a transmission region in which display is done in the transmission mode.

The currently available transflective LCD devices adopt an ECB mode, a TN mode and the like. Literature 3 described above also discloses adoption of the vertical alignment mode for, not only a transmissive LCD device, but also a transflective LCD device. Japanese Laid-Open Patent Publication No. 2002-350853 (Literature 7) discloses a technology in which in a transflective LCD device having a vertically aligned liquid crystal layer, the alignment (multi-axis alignment) of liquid crystal molecules is controlled with depressions formed on an insulating layer. The insulating layer is provided to make the thickness of the liquid crystal layer in a transmission region twice as large as that in a reflection region. According to this literature, the depressions are in the shape of a regular octagon, for example, and projections or slits (electrode openings) are formed at positions opposed to the depressions via the liquid crystal layer (see FIGS. 4 and 16 of Literature 7, for example).

The technology disclosed in Literature 2 or 3 has the following problems. Projections or openings are provided in each pixel to form a plurality of liquid crystal domains in the pixel (that is, divide the pixel into domains), to thereby strengthen the alignment regulating force on liquid crystal molecules. According to examinations conducted by the inventors of the present invention, however, to obtain sufficient alignment regulating force, it is necessary to form an alignment control structure such as projections and openings on both surfaces of the liquid crystal layer (on the surfaces of the pair of substrates opposed each other facing the liquid crystal layer), and this complicates the fabrication process. Moreover, the effective aperture ratio of a pixel having such an alignment regulating structure therein may decrease, and also the contrast ratio may decrease due to light leakage occurring in the peripheries of the projections in the pixel. In the case of providing the alignment regulating structure on both substrates, the substrate alignment margin must be taken into consideration. Therefore, the decrease in effective aperture ratio and/or the decrease in contrast ratio will become further conspicuous.

In the technology disclosed in Literature 4, a plurality of liquid crystal domains are formed in each pixel using wall spacers (the alignment direction of liquid crystal molecules is uniform in one domain and is different among different domains). Therefore, the wall spacers must be formed inside each pixel, and this causes decrease in effective aperture ratio and/or decrease in contrast ratio.

In the technology disclosed in Literature 7, it is necessary to provide projections or electrode openings at positions opposed to the depressions formed for control of the multi-axis alignment. This technology therefore has the same problems as those described above.

In any of the literature described above, openings are formed in the display electrodes so that the electroclinic alignment of liquid crystal molecules is defined with the effect of an electric field generated with application of a predetermined voltage. In this relation, when the liquid crystal panel is pressed, the aligned state of liquid crystal molecules disturbed with the pressing in the pressed portion tends to be fixed with the electric field defined with the electrode openings, and this may result in occurrence of display roughness and degradation in display quality.

In view of the above, an object of the present invention is providing a vertically aligned liquid crystal display device that can sufficiently stabilize the alignment of liquid crystal molecules with a comparatively simple construction and can provide display quality equal to or higher than that conventionally obtained.

Another object of the present invention is providing a liquid crystal display device having a plurality of axisymmetrically aligned domains in each pixel, in which axisymmetric alignment disturbed when the display screen is pressed, for example, can be effectively recovered and thus display failure such as roughness can be reduced to present high display quality.

SUMMARY OF THE INVENTION

In order to overcome the problems described above, the liquid crystal display device according to the first aspect of the present invention includes a first substrate, a second substrate opposed to the first substrate, and a vertically aligned liquid crystal layer interposed between the first substrate and the second substrate, wherein the liquid crystal display device has a plurality of pixels, each pixel including a first electrode formed on the first substrate, a second electrode formed on the second substrate, and the liquid crystal layer interposed between the first electrode and the second electrode, and a shading region provided around the plurality of pixels, a plurality of supports for defining the thickness of the liquid crystal layer are placed regularly on a surface of the first substrate or the second substrate facing the liquid crystal layer in the shading region, and the liquid crystal layer has at least one liquid crystal domain exhibiting axisymmetric alignment when at least a predetermined voltage is applied, and the tilt direction of liquid crystal molecules in the at least one liquid crystal domain is defined with inclined sides of the plurality of supports.

In one embodiment, each of the at least one liquid crystal domain is in contact with the inclined sides of at least four supports.

In another embodiment, the first electrode has at least one opening, and the center axis of each of the at least one liquid crystal domain is formed in or near the at least one opening.

In yet another embodiment, the inclined sides of the plurality of supports are inclined in an inversely tapered shape with respect to the first substrate.

In yet another embodiment, the shape of the plurality of supports along the plane parallel to the first substrate plane is roughly a circle, an ellipse, a diamond or a cross.

In yet another embodiment, the device further includes a wall structure regularly arranged in the shading region.

In yet another embodiment, the at least one liquid crystal domain includes two liquid crystal domains, the at least one opening includes two openings, and the center axes of the axisymmetric alignment of the two liquid crystal domains are formed in or near the two openings.

In yet another embodiment, the first electrode includes a transparent electrode defining a transmission region and a reflective electrode defining a reflection region.

In yet another embodiment, the at least one liquid crystal domain includes a liquid crystal domain formed in the transmission region and a liquid crystal domain formed in the reflection region.

In yet another embodiment, the at least one opening includes an opening formed in the transparent electrode and an opening formed in the reflective electrode.

In yet another embodiment, the device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In yet another embodiment, the device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The liquid crystal display device according to the second aspect of the present invention includes a first substrate having a first electrode, a second substrate having a second electrode opposed to the first electrode, and a vertically aligned liquid crystal layer interposed between the first electrode and the second electrode, each of a plurality of pixel regions being defined by the first electrode and the second electrode, wherein at least one pixel region among the plurality of pixel regions is divided into a plurality of sub-pixel regions with dielectric protrusions regularly arranged on the first substrate, and liquid crystal molecules in the liquid crystal layer in each sub-pixel region are axisymmetrically aligned around an axis vertical to the surface of the first substrate when a predetermined voltage is applied between the first electrode and the second electrode.

In one embodiment, the pixel region is surrounded with a shading region as is viewed from top, and the device further includes a wall structure formed to substantially surround the pixel region on the surface of the first substrate facing the liquid crystal layer in the shading region.

In another embodiment, the first electrode and/or the second electrode has an opening formed in the sub-pixel region, and when the voltage is applied, the vertical axis is formed in or near the opening.

In yet another embodiment, the pixel region is surrounded with a shading region as is viewed from top, and a support for defining the thickness of the liquid crystal layer is formed in the shading region.

In yet another embodiment, the first electrode includes a transparent electrode and a reflective electrode, and at least one of the plurality of sub-pixel regions is a transmission region and at least one of the sub-pixel regions is a reflection region.

In yet another embodiment, the relationship 0.3dt<dr<0.7dt is satisfied where dt is the thickness of the liquid crystal layer in the transmission region and dr is the thickness of the liquid crystal layer in the reflection region.

In yet another embodiment, the device further includes a transparent dielectric layer on the surface of the second substrate facing the liquid crystal layer.

In yet another embodiment, the transparent dielectric layer has a function of scattering light.

In yet another embodiment, the second substrate further includes a color filter layer, and the optical density of the color filter layer in the reflection region is lower than the optical density of the color filter layer in the transmission region.

In yet another embodiment, the device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In yet another embodiment, the device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

In yet another embodiment, the pixel region is in the shape of a rectangle having a pair of longer sides and a pair of shorter sides, and is divided into the plurality of sub-pixel regions with at least one pair of the dielectric protrusions, and the pair of dielectric protrusions extend from near the pair of longer sides of the pixel region in the directions closer to each other and are in line with each other in the shorter-side direction.

In the liquid crystal display devices according to the first aspect of the present invention, in which the supports (wall spacers) for defining the thickness of the liquid crystal layer are placed regularly in the shading region around the pixels, the inclined sides of the supports act to define the directions in which liquid crystal molecules tilt with an electric field. Since the supports for defining the thickness of the liquid crystal layer are used as an alignment regulating structure, no additional step for providing the alignment regulating structure is necessary. Since the supports are placed in the shading region, decrease in effective aperture ratio and decrease in contrast ratio are suppressed. By placing the supports so that each of liquid crystal domains is in contact with the inclined sides of at least four supports, axisymmetrically aligned domains can be formed stably. Further stable formation of axisymmetrically aligned domains is ensured by placing a wall structure in the shading region.

In addition, by placing an opening in the first electrode, the center axis of the axisymmetric alignment of a liquid crystal domain can be fixed in or near the opening. This provides display uniformity, and in particular, can suppress display roughness observed when the device is viewed at a slanting visual angle.

As described above, according to the first aspect of the present invention, a vertically aligned liquid crystal display device that can sufficiently stabilize the alignment of liquid crystal molecules with a comparatively simple construction and can provide display quality equal to or higher than that conventionally obtained is provided.

According to the second aspect of the present invention, the stability of the alignment of axisymmetrically aligned (radially tilting) liquid crystal domains can be enhanced, and thus the display quality of the liquid crystal display device having the conventional wide visual angle characteristics can be further improved. Also, in the event of a collapse of the axisymmetric alignment with external force, or a disturbance of the axisymmetric alignment with pressing of the display screen, for example, the axisymmetric alignment can be effectively recovered. Hence, a liquid crystal display device with high display quality that can reduce display failure such as roughness can be provided. Moreover, since such a liquid crystal display device with high display quality can be implemented with a comparatively simple construction, it can be easily fabricated.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 1A and 1B diagrammatically show one pixel of a transmissive LCD device 100 of an embodiment according to the first aspect of the present invention, in which FIG. 1A is a plan view and FIG. 1B is a cross-sectional view taken along line 1B-1B' in FIG. 1A.

FIGS. 2A and 2B diagrammatically show one pixel of another transmissive LCD device 100' of an embodiment according to the first aspect of the present invention, in which FIG. 2A is a plan view and FIG. 2B is a cross-sectional view taken along line 2B-2B' in FIG. 2A.

FIGS. 3A and 3B diagrammatically show one pixel of a transflective LCD device 200 of an embodiment according to the first aspect of the present invention, in which FIG. 3A is a plan view and FIG. 3B is a cross-sectional view taken along line 3B-3B' in FIG. 3A.

FIGS. 10A and 10B diagrammatically show one pixel of a transmissive LCD device 300, in which FIG. 10A is a plan view as is viewed in the direction normal to the substrate plane and FIG. 10B is a cross-sectional view taken along line 10B-10B' in FIG. 10A.

FIGS. 11A and 11B diagrammatically show one pixel of a transflective LCD device 400, in which FIG. 11A is a plan view as is viewed in the direction normal to the substrate plane and FIG. 11B is a cross-sectional view taken along line 11B-11B' in FIG. 11A.

FIGS. 12A to 12C are diagrammatic views of axisymmetrically aligned states obtained in an embodiment according to the second aspect of the present invention and conventionally obtained, in which FIG. 12A shows the alignment of liquid crystal domains in the steady state before pressing of the display plane, FIG. 12B shows the alignment after the pressing in a conventional pixel-divided panel, and FIG. 12C shows the alignment after the pressing in a pixel-divided panel of the embodiment of the present invention.

DETAILED DESCRIPTION OF PREFERRED EMBODIMENTS

Hereinafter, preferred embodiments of the present invention will be described with reference to the accompanying drawings.

First, the construction and operation of LCD devices according to the first aspect of the present invention will be described.

Transmissive LCD Device

Figure 1A:
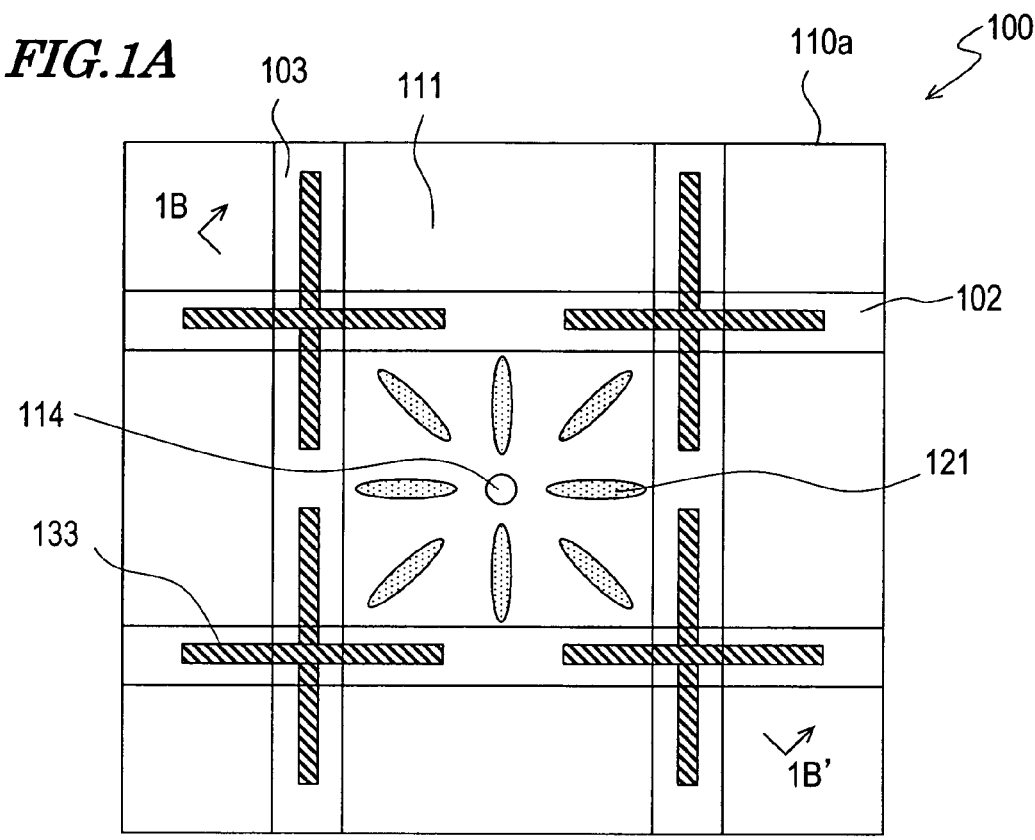
Figure 1B:
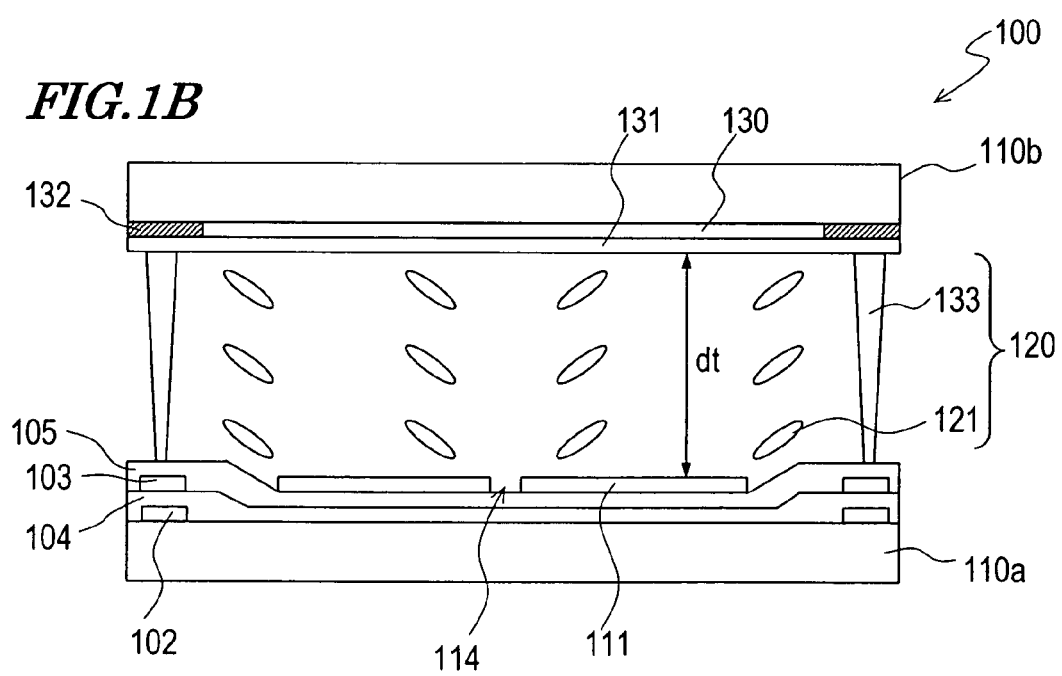

A transmissive LCD device 100 of an embodiment according to the first aspect of the present invention will be described with reference to FIGS. 1A and 1B. FIGS. 1A and 1B diagrammatically show one pixel of the transmissive LCD device 100, in which FIG. 1A is a plan view and FIG. 1B is a cross-sectional view taken along line 1B-1B' in FIG. 1A. FIG. 1B diagrammatically shows the aligned state of liquid crystal molecules 121 exhibited when a predetermined voltage (voltage equal to or higher than a threshold voltage) is applied to the liquid crystal layer.

The LCD device 100 includes a transparent substrate (for example, a glass substrate) 110a, a transparent substrate 110b placed to face the transparent substrate 110a, and a vertically aligned liquid crystal layer 120 interposed between the transparent substrates 110a and 110b. Vertical alignment films (not shown) are formed on the surfaces of the substrates 110a and 110b facing the liquid crystal layer 120. During non-voltage application, therefore, the liquid crystal molecules in the liquid crystal layer 120 are aligned roughly vertical to the surfaces of the vertical alignment films. The liquid crystal layer 120 includes a nematic liquid crystal material having negative dielectric anisotropy and also includes a chiral agent as required.

The LCD device 100 further includes pixel electrodes 111 formed on the transparent substrate 110a and a counter electrode 131 formed on the transparent substrate 110b. Each pixel electrode 111, the counter electrode 131 and the liquid crystal layer 120 interposed between these electrodes define a pixel. In the illustrated example, both the pixel electrodes 111 and the counter electrode 131 are formed of a transparent conductive film (for example, an ITO film). Typically, color filters 130 (the entire of the plurality of color filters may also be called a color filter layer 130) provided for the respective pixels, as well as a black matrix (shading layer) 132 formed in the gaps between the adjacent color filters 130, are formed on the surface of the transparent substrate 110b facing the liquid crystal layer 120, and the counter electrode 131 is formed on the color filters 130 and the black matrix 132. Alternatively, the color filters 130 and the black matrix 132 may be formed on the counter electrode 131 (on the surface thereof facing the liquid crystal layer 120).

The LCD device 100 has a shading region between the adjacent pixels, and supports (wall spacers) 133 are formed on the transparent substrate 110a in the shading region. The supports 133 define the thickness (also called a cell gap) dt of the liquid crystal layer 120. The shading region as used herein refers to a region shaded from light with the presence of TFTs (not shown), gate signal lines 102 and source signal lines 103 formed on the peripheries of the pixel electrodes 111 on the transparent substrate 110a, or the presence of the black matrix formed on the transparent substrate 110b, for example. Since this region does not contribute to display, the supports 133 formed in the shading region is free from adversely affecting the display.

In the LCD device 100, the supports 133 are placed at the crossings of the gate signal lines 102 and the source signal lines 103, to correspond to the four corners of each pixel roughly in the shape of a square. Each support 133 has a cross shape in the plane parallel to the transparent substrate 110a, composed of a portion parallel to the gate signal line 102 and a portion parallel to the source signal line 103. The support 133 has inclined sides, to act to define the directions in which the liquid crystal molecules 121 tilt with the inclined sides. This works because the liquid crystal molecules 121 attempt to align roughly vertical to the inclined sides (strictly, to the vertical alignment film on the inclined sides) and thus are alignment-regulated toward the directions corresponding to the tilt directions and angles of the inclined sides. This alignment regulating force acts even during non-voltage application. The illustrated inclined sides of the supports 133 are inclined in an inversely tapered shape with respect to the transparent substrate 110a. This inclination is preferred because the alignment regulation directions given with the inclined sides agree with alignment regulation directions given with an inclined electric field generated near an opening 114 in the pixel electrode 111 formed on the transparent substrate 110a.

The shape of the supports 133 in the plane parallel to the transparent substrate 110a is not limited to a cross, but the supports 133 may be roughly in the shape of a polygon such as a circle, an ellipse and a diamond. The inclined sides of the supports 133 define the directions of tilt of the liquid crystal molecules 121 and act to define the outer edges of axisymmetrically aligned domains. Therefore, the shape of the supports 133 may be determined so that the axisymmetric alignment of the liquid crystal domains can be stably formed, depending on the shape of the liquid crystal domains and the positions of placement of the supports 133. The supports 133 can be formed in a photolithographic process using a photosensitive resin, for example. The supports 133 may be formed on any of the transparent substrates 110a and 110b. As described above, however, to obtain the supports 133 having inclined sides inversely tapered with respect to the transparent substrate 110a, it is easy to form tapered supports on the transparent substrate 110b, and thus it is preferred to form the supports 133 on the transparent substrate 110b.

The pixel electrode 111 has the opening 114 formed at a predetermined position. When a predetermined voltage is applied across the liquid crystal layer 120, a liquid crystal domain having axisymmetric alignment is formed, with the center axis of the axisymmetric alignment thereof being in or near the opening 114. As will be described later, the opening 114 formed in the pixel electrode 111 acts to fix the position of the center axis of the axisymmetric alignment. An inclined electric field is generated near the opening 114 with the voltage applied between the pixel electrode 111 and the counter electrode 113. With the inclined electric field, the directions of tilt of the liquid crystal molecules are defined, to thereby cause the action described above.

The shape of the opening 114 provided to fix/stabilize the center axis of the axisymmetrically aligned domains is preferably circular as illustrated, but not limited to this. To exert roughly equal alignment regulating force in all directions, the shape is preferably a polygon having four or more sides and more preferably a regular polygon.

In the LCD device 100, when a predetermined voltage (voltage equal to or higher than a threshold voltage) is applied between the pixel electrode 111 and the counter electrode 131, an axisymmetrically aligned domain of which the center axis is fixed/stabilized in or near the opening 114 is formed. The alignment regulating force of the inclined sides of the supports 133 provided on the periphery of the pixel define the directions in which the liquid crystal molecules 121 existing near the outer edges of the liquid crystal domain fall. The inclined electric field generated near the opening 114 in the pixel electrode 111 defines the directions in which the liquid crystal molecules 121 near the opening 114 fall. The alignment regulating force of the inclined sides of the supports 133 and the alignment regulating force of the opening 114 are considered to act cooperatively, to stabilize the axisymmetric alignment of the liquid crystal domain.

The transparent substrate 110a, together with the circuit elements such as the TFTs (not shown), the gate signal lines 102 and the source signal lines 103 connected to the TFTs, a gate insulating film 104, a protection layer 105, the pixel electrodes 111, the supports 133, the alignment film (not shown) and the like formed on the surface of the transparent substrate 110a facing the liquid crystal layer 120, are collectively called an active matrix substrate in some cases. Likewise, the transparent substrate 110b, together with the color filter layer 130, the black matrix 132, the counter electrode 131, the alignment film and the like formed on the transparent substrate 110b, are collectively called a counter substrate or a color filter substrate in some cases.

Although omitted in the above description, the LCD device 100 further includes a pair of polarizing plates placed to face each other via the transparent substrates 110a and 110b. The polarizing plates are typically placed so that their transmission axes are orthogonal to each other. The LCD device 100 may further include a biaxial optical anisotropic medium layer and/or a uniaxial optical anisotropic medium layer, as will be described later.

Figure 2A:
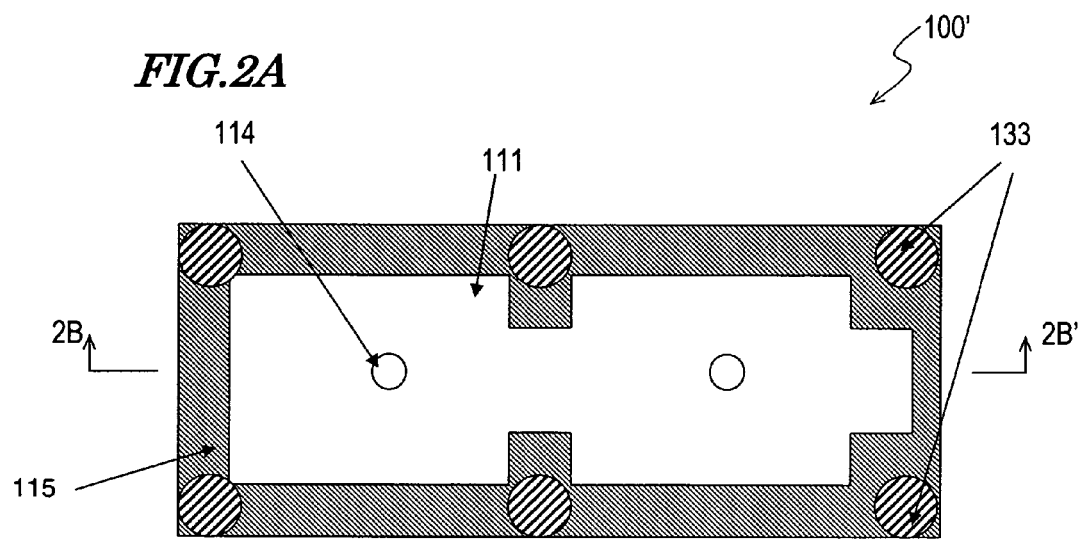
Figure 2B:
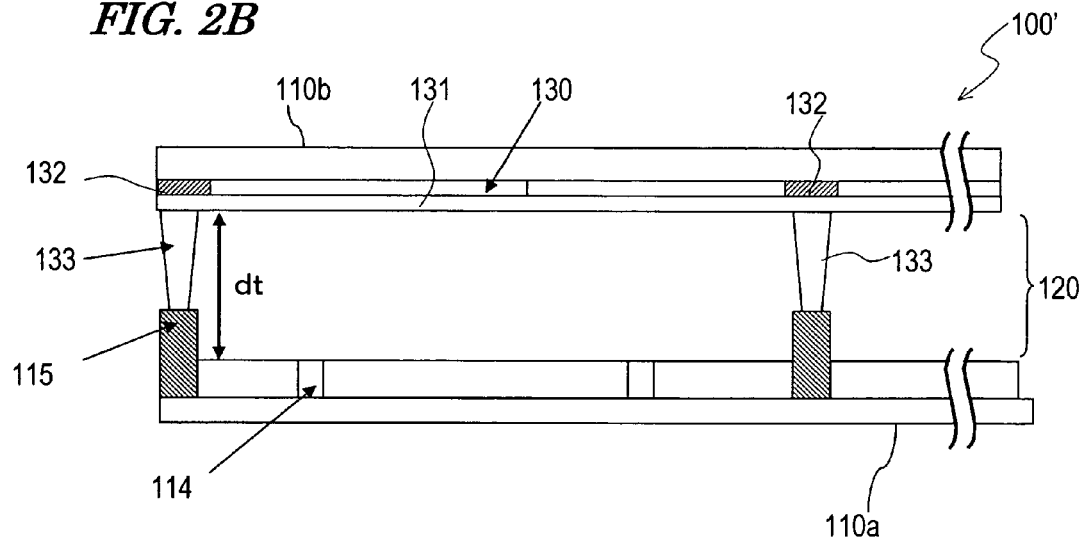

FIGS. 2A and 2B diagrammatically show another transmissive LCD device 100' of an embodiment according to the first aspect of the present invention. Components having substantially the same functions as those of the LCD 100 shown in FIGS. 1A and 1B are denoted by the same reference numerals, and the description thereof is omitted here. FIG. 2A is a plan view and FIG. 2B is a cross-sectional view taken along line 2B-2B' in FIG. 2A.

The LCD device 100' has a wall structure 115 on the transparent substrate 10a, and supports 133 are formed on the wall structure 115. The wall structure 115 acts to form axisymmetrically aligned domains with the alignment regulating force of the wall sides thereof, as in the case of the supports 133. The wall structure 115 may be formed on any one of the transparent substrates 110a and 110b. If inversely tapered wall sides are to be given, like the inclined sides of the supports 133, the wall structure 115 is preferably formed on the transparent substrate 110b. In this case, however, the number of fabrication steps will disadvantageously increase. If the wall structure 115 is formed on the transparent substrate 110a (active matrix substrate), the wall structure 115 can be formed integrally with an interlayer insulating film by adjusting the exposure in the process for forming the interlayer insulating film using a photosensitive resin, for example. In this case, the wall faces of the wall structure 115 tend to be tapered. It is however possible to reduce the disagreement between the alignment regulating force of the wall faces and the alignment regulating force of the inversely tapered inclined sides of the supports 133 by setting the tilt angle at 40° or more. Naturally, it is more preferred to form the wall structure having inversely tapered wall faces (tilt angle exceeding 90°).

The wall structure 115 has a portion formed in the shading region around each pixel to substantially surround the pixel and a pair of extended portions extending toward the center of the pixel from the portion surrounding the pixel at the positions bisecting the pixel in the length direction. The extended portions of the wall structure 115 act to define two liquid crystal domains formed in the pixel. The extended portions are preferably formed in a region in which a line (for example, a storage capacitance line (not shown)) extends because in such a region the extended portions are free from adversely affecting the display. The wall structure 115 shown in the illustrated example is a continuous wall, but may be composed of a plurality of separate walls. The wall structure 115, which acts to define boundaries of liquid crystal domains located near the outer edges of the pixel, should preferably have a length of some extent. For example, when the wall structure is composed of a plurality of walls, each wall is preferably longer than the gap between the adjacent walls.

The supports 133 are provided to correspond to the four corners of each of the two liquid crystal domains formed in each pixel, and act to define the boundaries of the liquid crystal domains. The positions of the supports 133 are not limited to on the wall structure 115 formed in the shading region as illustrated. In the case of forming the supports 133 on the wall structure 115, setting is made so that the sum of the height of the wall structure 115 and the height of the supports 133 is equal to the thickness dt of the liquid crystal layer 120. If the supports 133 are formed in a region having no wall structure 115, setting is made so that the height of the supports 133 is equal to the thickness dt of the liquid crystal layer 120. To sufficiently exert the alignment regulating force of the side faces of the supports 133, the height of the supports 133 is preferably larger than the height of the wall structure 115. The supports 133 may be formed on any one of the transparent substrates 110a and 110b, but preferably is formed on the transparent substrate 110b as described above. In the illustrate example, the supports 133 are roughly in the shape of a circle, but the shape can be appropriately changed as in the case described above.

The pixel electrode 111 has two openings 114 in roughly the centers of two liquid crystal domains of which the boundaries are defined with the supports 133 and the wall structure 115. When a predetermined voltage is applied across the liquid crystal layer 120, liquid crystal domains having axisymmetric alignment are formed, with the center axes of the axisymmetric alignment thereof being in or near the openings 114. In this way, the alignment regulating force of the inclined sides of the supports 133 and the wall faces of the wall structure 115 and the alignment regulating force of the openings 114 are considered to act cooperatively, to stabilize the axisymmetric alignment of the liquid crystal domains. The shape of the openings 114 may be changed appropriately as described above.

Transflective LCD Device

Next, a transflective LCD device 200 of an embodiment according to the first aspect of the present invention will be described with reference to FIGS. 3A and 3B.

Figure 3A:
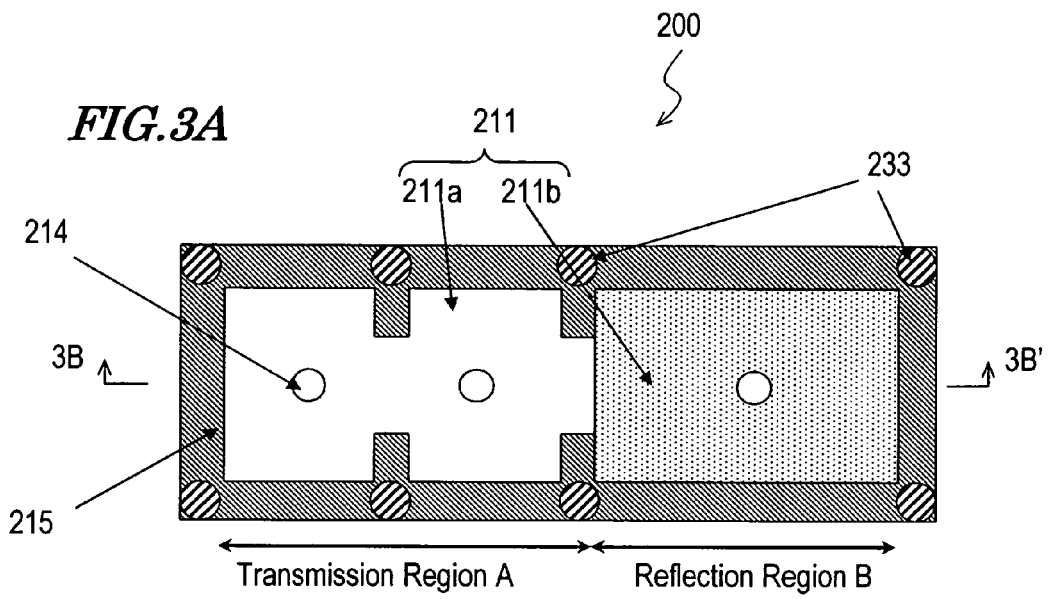
Figure 3B:
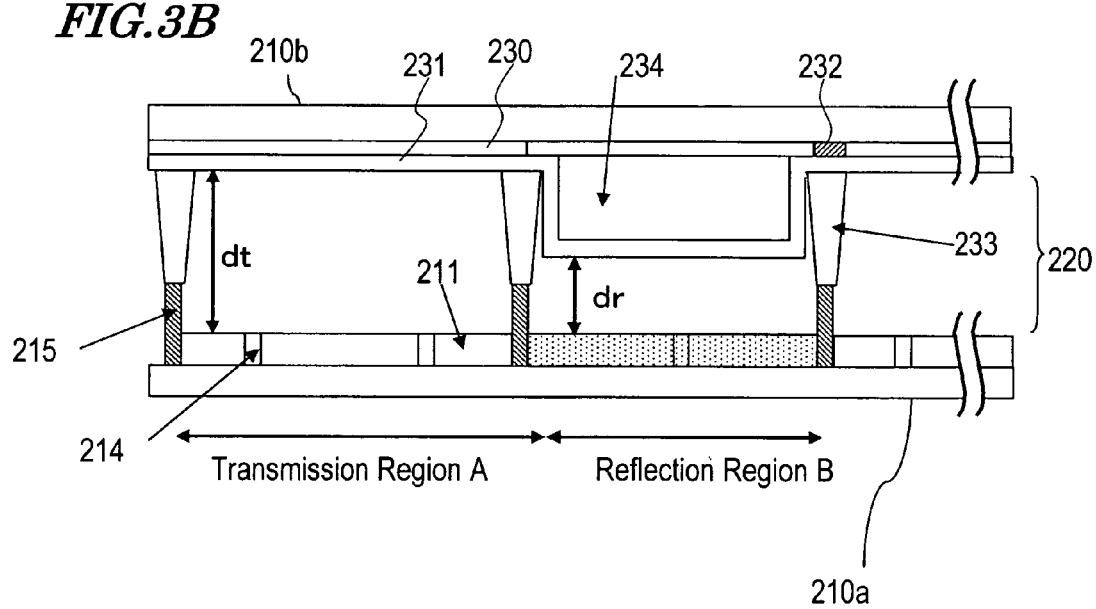

FIGS. 3A and 3B diagrammatically show one pixel of the transflective LCD device 200 of the embodiment of the present invention, in which FIG. 3A is a plan view and FIG. 3B is a cross-sectional view taken along line 3B-3B' in FIG. 3A.

The LCD device 200 includes a transparent substrate (for example, a glass substrate) 210a, a transparent substrate 210b placed to face the transparent substrate 210a, and a vertically aligned liquid crystal layer 220 interposed between the transparent substrates 210a and 210b. Vertical alignment films (not shown) are formed on the surfaces of the substrates 210a and 210b facing the liquid crystal layer 220. During non-voltage application, therefore, liquid crystal molecules in the liquid crystal layer 220 are aligned roughly vertical to the surfaces of the vertical alignment films. The liquid crystal layer 220 includes a nematic liquid crystal material having negative dielectric anisotropy and also includes a chiral agent as required.

The LCD device 200 further includes pixel electrodes 211 formed on the transparent substrate 210a and a counter electrode 231 formed on the transparent substrate 210b. Each pixel electrode 211, the counter electrode 231 and the liquid crystal layer 220 interposed between these electrodes define a pixel. Circuit elements such as TFTs are formed on the transparent substrate 210a as will be described later. Herein, the transparent substrate 210a and the components formed thereon are collectively called an active matrix substrate 210a in some cases.

Typically, color filters 230 (the entire of the plurality of color filters may also be called a color filter layer 230) provided for the respective pixels, as well as a black matrix (shading layer) 232 provided in the gaps between the adjacent color filters 230, are formed on the surface of the transparent substrate 210b facing the liquid crystal layer 220, and the counter electrode 231 is formed on the color filters 230 and the black matrix 232. Alternatively, the color filters 230 and the black matrix 232 may be formed on the counter electrode 231 (on the surface thereof facing the liquid crystal layer 220). Herein, the transparent substrate 210b and the components formed thereon are collectively called a counter substrate (color filter substrate) 210b in some cases.

Each pixel electrode 211 includes a transparent electrode 211a formed of a transparent conductive layer (for example, an ITO layer) and a reflective electrode 211b formed of a metal layer (for example, an Al layer, an alloy layer including Al, and a layered film including any of these layers). Having such a pixel electrode, each pixel includes a transmission region A defined by the transparent electrode 211a and a reflection region B defined by the reflective electrode 211b, to provide display in the transmission mode and display in the reflection mode, respectively.

The LCD device 200 has a wall structure 215 formed on the transparent substrate 210a, and supports 233 are formed on the wall structure 215. The wall structure 215 acts to form axisymmetrically aligned domains with the alignment regulating force of the wall faces thereof, as do supports 233. The wall structure 215 has a portion formed in the shading region around each pixel to substantially surround the pixel and two pairs of extended portions extending toward the center of the pixel from the portion surrounding the pixel to divide the pixel into three in the length direction.

One of the pairs of extended portions are formed at positions near the boundary between the transmission region A and the reflection region B, and the other pair of extended portions are formed at positions bisecting the transmission region in the length direction. The supports 233 are provided to correspond to the four corners of each of the three liquid crystal domains formed in the pixel, and act to define the boundaries the liquid crystal domains. The alignment regulating force of the inclined sides of the supports 233 placed as described above and the alignment regulating force of the wall faces of the wall structure 115 define the directions in which liquid crystal molecules fall during voltage application, to form three liquid crystal domains (two in the transmission region A and one in the reflection region B).

The pixel electrode 211 has three openings 214 formed to correspond to about the centers of three liquid crystal domains. When a predetermined voltage is applied across the liquid crystal layer 220, three liquid crystal domains having axisymmetric alignment are formed, with the center axes of the axisymmetric alignment thereof being in or near the openings 214. The openings 214 formed in the pixel electrode 211 act to fix the positions of the center axes of the axisymmetric alignment. An inclined electric field is generated near the openings 214 with the voltage applied between the pixel electrode 211 and the counter electrode 213. With the inclined electric field, the directions of tilt of the liquid crystal molecules are defined, to thereby cause the action described above.

The placement of the supports 233, the wall structure 215 and the openings 214 and preferred shapes thereof are similar to the case of the transmissive LCD device 100' described above. In FIGS. 3A and 3B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment. The wall structure 215 may be omitted.

In the LCD device 200, when a predetermined voltage (voltage equal to or higher than a threshold voltage) is applied between the pixel electrode 211 and the counter electrode 231, three axisymmetrically aligned domains are formed with the center axes thereof being stabilized in or near the three openings 214. The eight supports 233 and the wall structure 215 define the directions in which liquid crystal molecules in the three adjacent liquid crystal domains fall with an electric field, and also stabilize the boundaries of the liquid crystal domains located near the outer edges of the pixel.

Next, a preferred construction specific to the transflective LCD device 200 permitting both the transmission-mode display and the reflection-mode display will be described.

While light used for display passes through the liquid crystal layer 220 once in the transmission-mode display, it passes through the liquid crystal layer 220 twice in the reflection-mode display. Accordingly, as diagrammatically shown in FIG. 3B, the thickness dt of the liquid crystal layer 220 in the transmission region A is preferably set roughly double the thickness dr of the liquid crystal layer 220 in the reflection region B. By setting in this way, the retardation given to the light by the liquid crystal layer 220 can be roughly the same in both display modes. Most preferably, dr=0.5dt should be satisfied, but good display is secured in both display modes as long as 0.3dt<dr<0.7dt is satisfied. Naturally, dt=dr may be satisfied depending on the use.

In the LCD device 200, a transparent dielectric layer 234 is provided on the glass substrate 210b only in the reflection region B to make the thickness of the liquid crystal layer 220 in the reflection region B smaller than that in the transmission region A. This construction eliminates the necessity of providing a step by forming an insulating film and the like under the reflective electrode 211b, and thus has the advantage of simplifying the fabrication of the active matrix substrate 210a. If the reflective electrode 211b is formed on such an insulting film provided to give a step for adjusting the thickness of the liquid crystal layer 220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 234 is provided with a function of scattering light (diffuse reflection function), good white display close to paper white can be realized without the necessity of providing the reflective electrode 211b with the diffuse reflection function. Such white display close to paper white can also be realized by making the surface of the reflective electrode 211b uneven, and in this case, no light scattering function is necessary for the transparent dielectric layer 234. However, the uneven surface may fail to stabilize the position of the center axis of the axisymmetric alignment depending on the shape of the uneven surface. On the contrary, by combining the transparent dielectric layer 234 having the light scattering function and the reflective electrode 211b having a flat surface, the position of the center axis can be stabilized with the opening 214 (the shading conductive layer 216b) formed in the reflective electrode 211b more reliably. Note that in the case of making the surface of the reflective electrode 211b uneven to provide the reflective electrode 211b with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 230 once in the transmission mode, it passes through the color filter layer 230 twice in the reflection mode. Accordingly, if the color filter layer 230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged.

Figure 4:
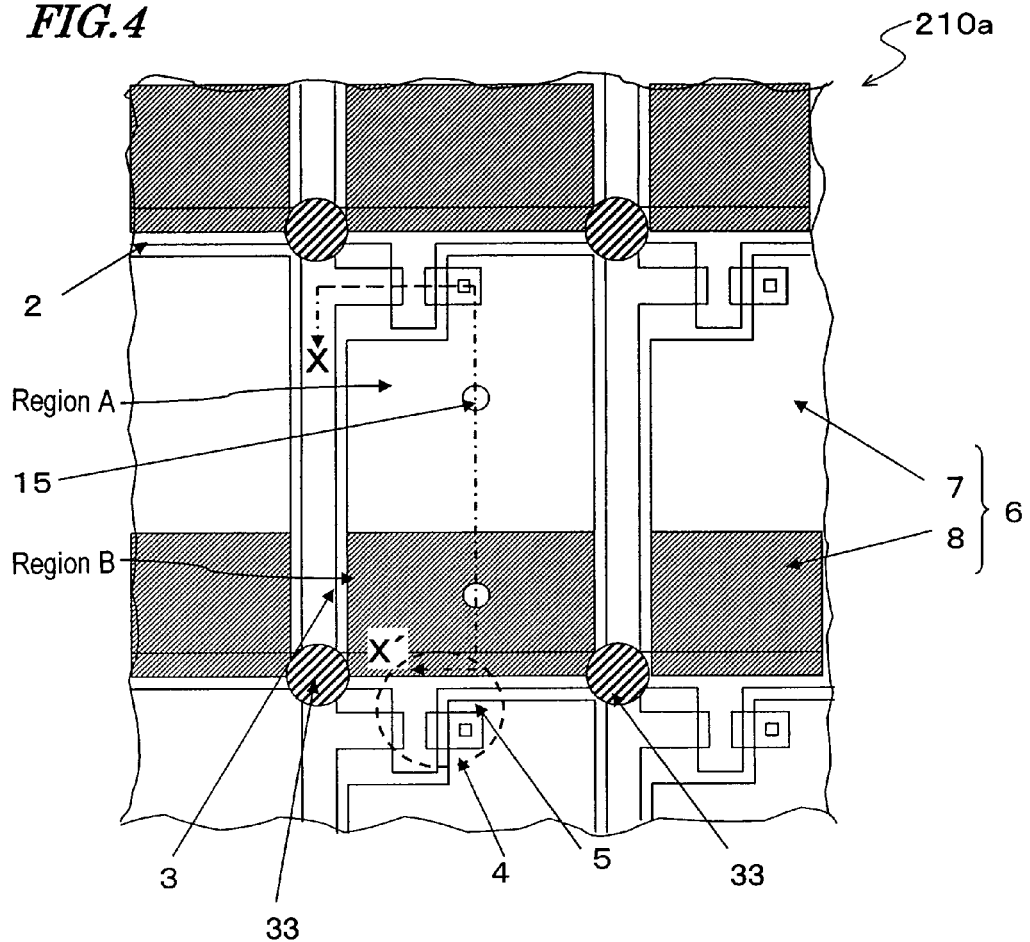
FIG. 4 is a plan view of an active matrix substrate 210a of the transflective LCD device 200.
Figure 5:
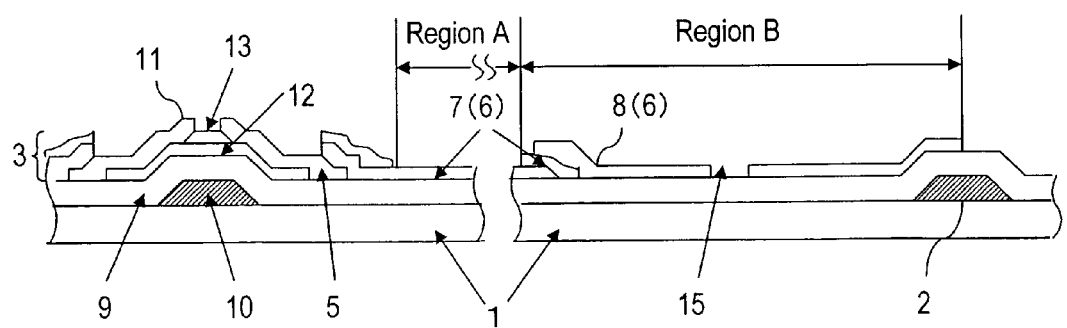
FIG. 5 is a cross-sectional view of the active matrix substrate 210a of the transflective LCD device 200.

Next, referring to FIGS. 4 and 5, an example of the structure of an active matrix substrate suitably used for the transflective LCD device will be described. FIG. 4 is a partial enlarged view of the active matrix substrate, and FIG. 5 is a cross-sectional view taken along line X-X' in FIG. 4. The active matrix substrate shown in FIGS. 4 and 5 can be the same in construction as the active matrix substrate 211a shown in FIGS. 3A and 3B, except that one liquid crystal domain is formed in the transmission region A (that is, the number of the openings 214 is reduced).

The active matrix substrate shown in FIGS. 4 and 5 has a transparent substrate 1 made of a glass substrate, for example. Gate signal lines 2 and source signal lines 3 run on the transparent substrate 1 to cross each other at right angles. TFTs 4 are formed near the crossings of these signal lines 2 and 3. Drain electrodes 5 of the TFTs 4 are connected to corresponding pixel electrodes 6.

Each of the pixel electrode 6 includes a transparent electrode 7 made of a transparent conductive layer such as an ITO layer and a reflective electrode 8 made of Al and the like. The transparent electrode 7 defines a transmission region A, and the reflective electrode 8 defines a reflection region B. Openings 15 are formed at predetermined positions of the pixel electrode 6 for fixing/stabilizing the center axes of the axisymmetrically aligned domains as described above.

The pixel electrode 6 overlaps the gate signal line for the next row via a gate insulating film 9, forming a storage capacitance. The TFT 4 has a multilayer structure including the gate insulating film 9, a semiconductor layer 12, a channel protection layer 13 and an n$^+$-Si layer 11 (source/drain electrodes) formed in this order on a gate electrode 10 branched from the gate signal line 2.

Supports 33 may be formed in the region surrounding each pixel electrode 6 on the active matrix substrate, or may be formed on the counter substrate so that the supports 33 exist in the region surrounding each pixel electrode 6 when the counter substrate is bonded with the active matrix substrate. The wall structure 215 may be formed in the region surrounding each pixel electrode 6 on the active matrix substrate.

The illustrated TFT is of a bottom gate type. The TFT is not limited to this type, but a top gate type TFT can also be used.

As described above, in the LCD device 200 having the construction described in FIGS. 3A and 3B, the alignment of liquid crystal molecules is regulated using the supports 233 for defining the thickness of the liquid crystal layer 220. The wall structure 215 for stable formation of liquid crystal domains and the openings 214 for fixing/stabilizing the center axes may only be formed on one of the substrates. With this comparatively simple construction, the alignment of liquid crystal molecules can be sufficiently stabilized. In addition, with the placement of the transparent dielectric layer 234 and/or the color filter 230 in the manner described above, the display brightness and color purity in both the transmission mode and the reflection mode can be improved.

Operation Principle

The reason why the LCD device having a vertically aligned liquid crystal layer in the first aspect of the present invention has excellent wide viewing angle characteristics will be described with reference to FIGS. 6A and 6B.

Figure 6A:
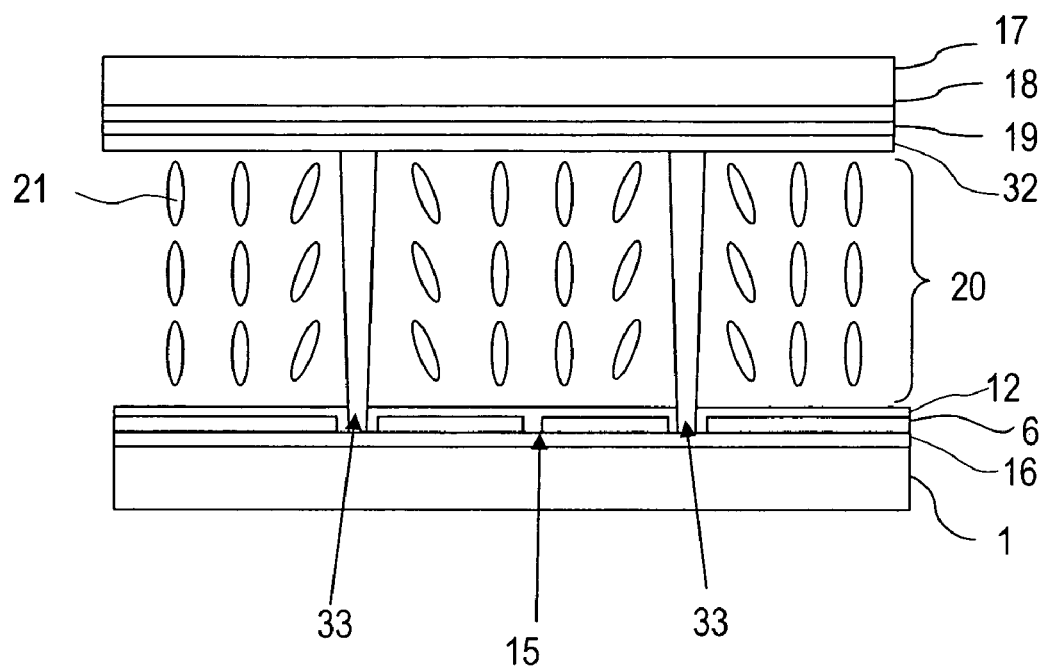
FIGS. 6A and 6B are diagrammatic views for demonstrating the operation principle of the LCD devices of the embodiments according to the first aspect of the present invention, showing the states during non-voltage application (FIG. 6A) and during voltage application (FIG. 6B).
Figure 6B:
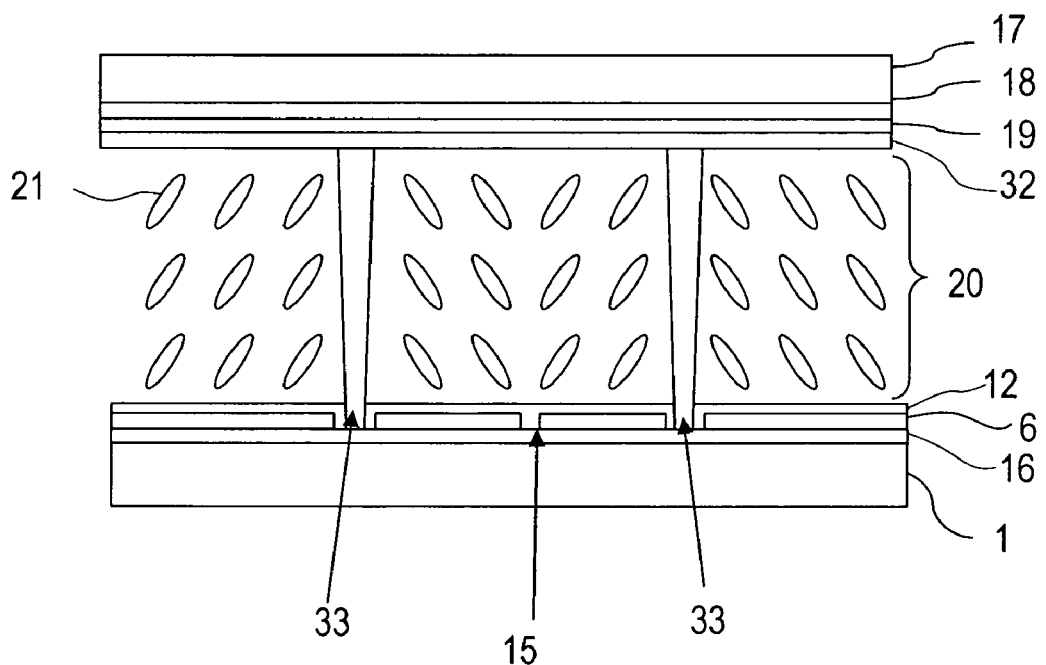

FIGS. 6A and 6B are views for demonstrating how the alignment regulating force of an opening 15 formed in the pixel electrode 6 acts, in which the aligned states of liquid crystal molecules during non-voltage application (FIG. 6A) and during voltage application (FIG. 6B) are diagrammatically shown.

The LCD device shown in FIGS. 6A and 6B includes an insulating film 16, a pixel electrode 6 having an opening 15 and an alignment film 12 formed in this order on a transparent substrate 1. The LCD device also includes a color filter layer 18, a counter electrode 19, supports 33, and an alignment film 32 formed in this order on another transparent substrate 17. Although omitted in FIGS. 6A and 6B, the alignment film 32 is formed to cover the supports 33. A liquid crystal layer 20 interposed between the two substrates includes liquid crystal molecules 21 having negative dielectric anisotropy.

As shown in FIG. 6A, during non-voltage application, the liquid crystal molecules 21 are aligned roughly vertical to the substrate surface with the alignment regulating force of the vertical alignment films 12 and 32. The supports 33 have inclined sides inversely tapered with respect to the substrate 1. The liquid crystal molecules 21 near the inclined sides of the supports 33 attempt to align roughly vertical to the inclined sides, and thus tilt with respect to the surface of the substrate 1.

As shown in FIG. 6B, during voltage application, the liquid crystal molecules 21 having negative dielectric anisotropy attempt to make their major axes vertical to electric lines of force, and this causes the directions in which the liquid crystal molecules 21 fall to be defined with an inclined electric field generated around the opening 15. Also, the liquid crystal molecules 21 near the supports 33 attempt to further tilt in the direction in which the liquid crystal molecules 21 have already tilted with the alignment regulating force of the inclined sides of the supports 33. Hence, the liquid crystal molecules are aligned axisymmetrically around the opening 15 as the center, for example. In the resultant axisymmetrically aligned domain, the liquid crystal directors point to all directions (directions in the substrate plane), and thus, excellent viewing angle characteristics can be obtained.

When a wall structure is additionally provided, the wall structure defines the directions in which the liquid crystal molecules 21 fall with the alignment regulating force of the side faces (wall faces) thereof. Typically, since the wall structure is covered with a vertical alignment film, the alignment regulating force exerts to align the liquid crystal molecules vertical to the wall faces. The wall faces of the wall structure are preferably inclined in the same direction as the supports 33.

Next, an example of more specific construction of the LCD device according to the first aspect of the present invention will be described with reference to FIG. 7.

Figure 7:
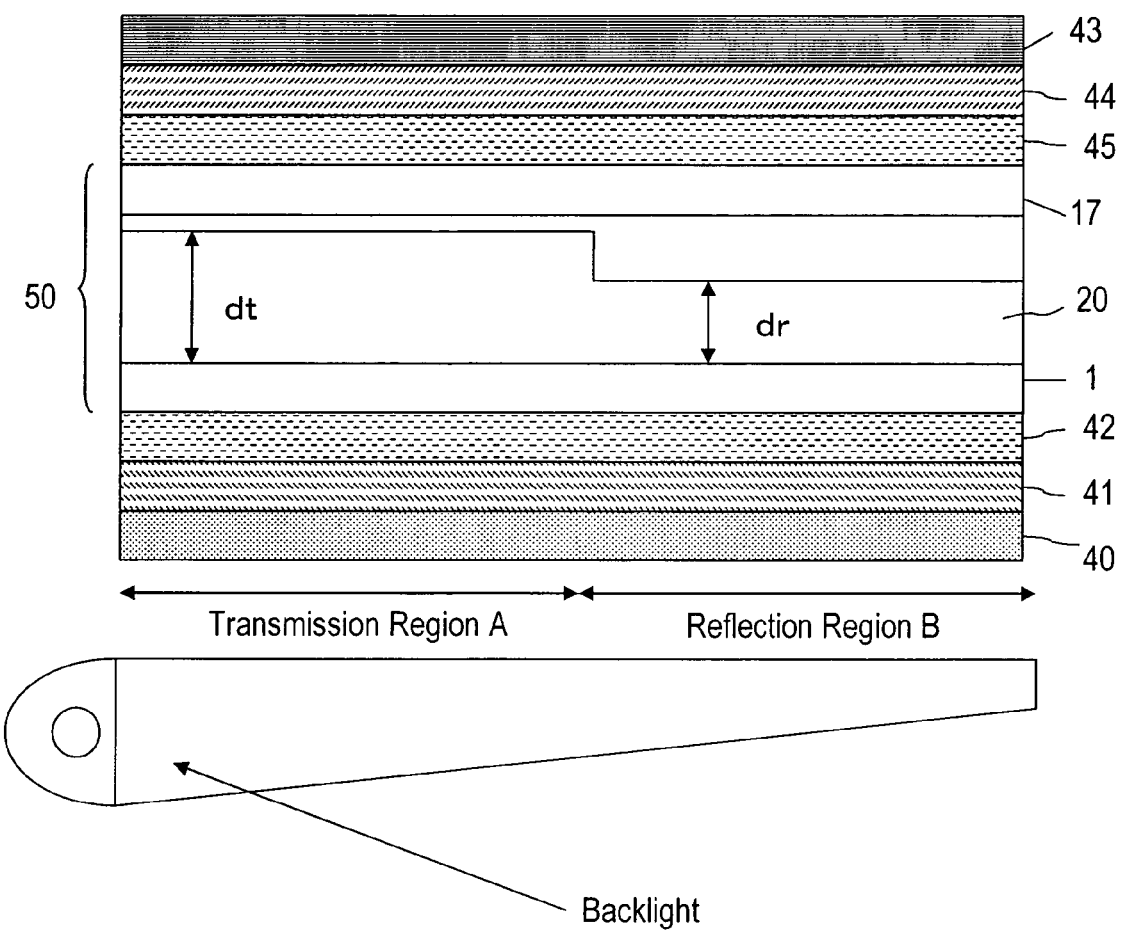
FIG. 7 is a diagrammatic view showing an example of construction of an LCD device according to the first aspect of an embodiment of the present invention.

The LCD device shown in FIG. 7 includes: a backlight; a transflective liquid crystal panel 50; a pair of polarizing plates 40 and 43 placed to face each other via the transflective liquid crystal panel 50; quarter wave plates 41 and 44 respectively placed between the polarizing plates 40 and 43 and the liquid crystal panel 50; and phase plates 42 and 45 having negative optical anisotropy respectively placed between the wave plates 41 and 44 and the liquid crystal panel 50. The liquid crystal panel 50 includes a vertically aligned liquid crystal layer 20 between a transparent substrate (active matrix substrate) 1 and a transparent substrate (counter substrate) 17. As the liquid crystal panel 50, one having the same construction as that of the LCD device 200 shown in FIGS. 3A and 3B is used.

The display operation of the LCD device shown in FIG. 7 will be briefly described.

In reflection-mode display, light incident from above passes through the polarizing plate 43 to be output as linearly polarized light. The linearly polarized light is changed to circularly polarized light with the quarter wave plate 44 placed so that the slower axis thereof forms 45° with the transmission axis of the polarizing plate 43. The circularly polarized light passes through the color filter layer (not shown) formed on the substrate 17. In the illustrated example, the phase plate 45 provides no phase difference for light incident in the normal direction.

During non-voltage application, in which liquid crystal molecules in the liquid crystal layer 20 are aligned roughly vertical to the substrate plane, incident light passes through the liquid crystal layer 20 with a phase difference of roughly 0 and is reflected with the reflective electrode formed on the lower substrate 1. The reflected circularly polarized light passes again through the liquid crystal layer 20 and the color filter layer. The light then passes through the phase plate 45 having negative optical anisotropy as the circularly polarized light, to enter the quarter wave plate 44, where the light is changed to linearly polarized light having a polarizing direction orthogonal to the polarizing direction given to the incident light after first passing through the polarizing plate 43, and reaches the polarizing plate 43. The resultant linearly polarized light fails to pass through the polarizing plate 43, and thus black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20, and reflected with the reflective electrode formed on the lower substrate 1. The polarized state of the reflected light is further changed during passing back through the liquid crystal layer 20. The reflected light passes again through the color filter layer and then the phase plate 45 having negative optical anisotropy, to enter the quarter wave plate 44 as the elliptically polarized light. Accordingly, when reaching the polarizing plate 43, the light is not linearly polarized light having a polarizing direction orthogonal to the polarizing direction given to the original incident light, and thus passes through the polarizing plate 43. That is to say, by adjusting the applied voltage, the degree of the tilt of the liquid crystal molecules can be controlled, and thus the amount of reflected light allowed to pass through the polarizing plate 43 can be changed, to thereby enable grayscale display.

In transmission-mode display, the upper and lower polarizing plates 43 and 40 are placed so that the transmission axes thereof are orthogonal to each other. Light emitted from a light source is changed to linearly polarized light at the polarizing plate 40, and then changed to circularly polarized light when being incident on the quarter wave plate 41 placed so that the slower axis thereof forms 45° with the transmission axis of the polarizing plate 40. The circularly polarized light then passes through the phase plate 42 having negative optical anisotropy and is incident on the transmission region A of the lower substrate 1. In the illustrated example, the phase plate 42 provides no phase difference for light incident in the normal direction.

During non-voltage application, in which liquid crystal molecules in the liquid crystal layer 20 are aligned roughly vertical to the substrate plane, the incident light passes through the liquid crystal layer 20 with a phase difference of roughly 0. That is, the light incident on the lower substrate 1 as circularly polarized light passes through the liquid crystal layer 20 and then the upper substrate 17 in this state. The light then passes through the upper phase plate 45 having negative optical anisotropy, to enter the quarter wave plate 44. The lower and upper quarter wave plates 41 and 44 are placed so that the slower axes thereof are orthogonal to each other. Therefore, a phase difference in the polarized light that has entered the quarter wave plate 44, which was given at the lower quarter wave plate 41, can be cancelled with the quarter wave plate 44, and thus the light resumes the original linearly polarized light. The polarized light coming from the upper quarter wave plate 44 is therefore linearly polarized light having the polarizing direction parallel with the transmission axis (polarizing axis) of the polarizing plate 40, and thus absorbed with the polarizing plate 43 of which the transmission axis is orthogonal to that of the polarizing plate 40. Accordingly, black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20. The light then passes through the color filter layer 17, the phase plate 45 having negative optical anisotropy, and the quarter wave plate 44 as the elliptically polarized light. Accordingly, when reaching the polarizing plate 43, the light is not linearly polarized light orthogonal to the polarized component in the original incident light, and thus passes through the polarizing plate 43. That is to say, by adjusting the applied voltage, the degree of the tilt of the liquid crystal molecules can be controlled, and thus the amount of light allowed to pass through the polarizing plate 43 can be changed, to thereby enable grayscale display.

The phase plate having negative optical anisotropy minimizes the amount of change in phase difference occurring with change of the viewing angle when the liquid crystal molecules are in the vertically aligned state, and thus suppresses black floating observed when the display device is viewed at a wide viewing angle. In place of the combination of the phase plate having negative optical anisotropy and the quarter wave plate, a biaxial phase plate unifying the functions of both plates may be used.

When axisymmetrically aligned domains are used to implement the normally black mode that presents black display during non-voltage application and white display during voltage application, as in the present invention, a polarizing plate-caused extinction pattern can be eliminated by placing a pair of quarter wave plates on the top and bottom of the LCD device (panel), and thus the brightness can be improved. Also, when axisymmetrically aligned domains are used to implement the normally black mode with upper and lower polarizing plates placed so that the transmission axes thereof are orthogonal to each other, it is theoretically possible to present black display of substantially the same level as that obtained when a pair of polarizing plates are placed under crossed nicols. Therefore, a considerably high contrast ratio can be obtained, and also, with the all-direction alignment of liquid crystal molecules, wide viewing angle characteristics can be attained.

Figure 8:
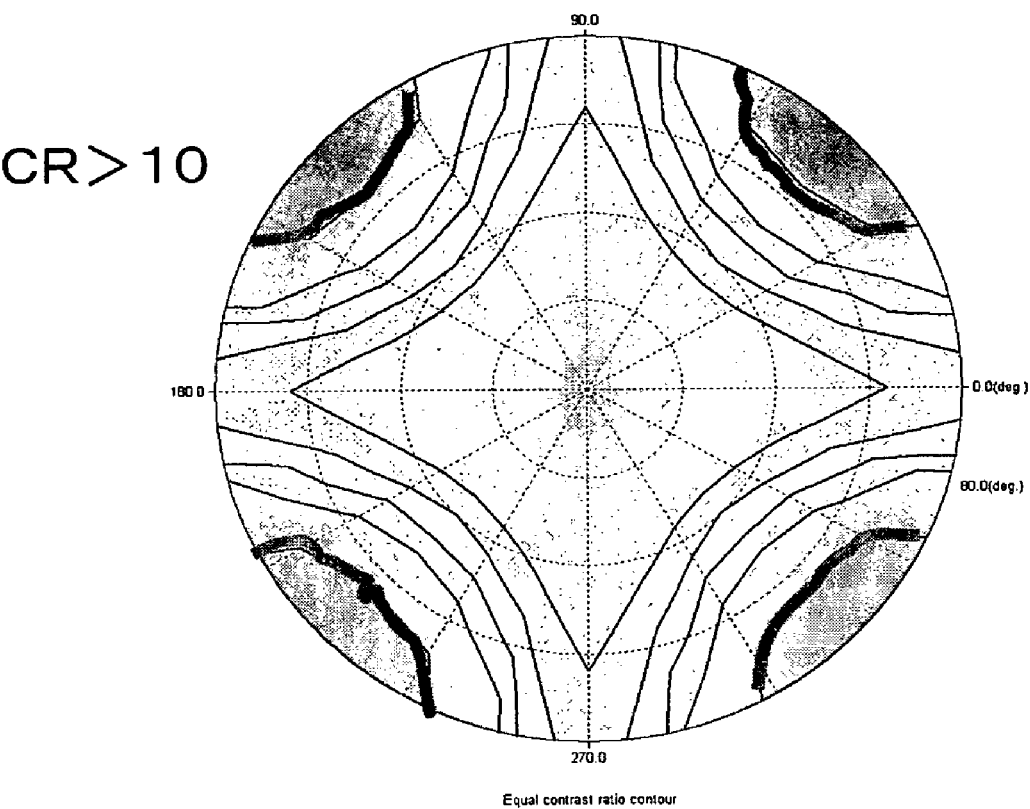
FIG. 8 is a view showing the visual angle—contrast ratio characteristics of an LCD device of an embodiment according to the first aspect of the present invention.

The thicknesses dt and dr of the liquid crystal layer in the transmission region and the reflection region defined in the present invention preferably has the relationship satisfying 0.3dt<dr<0.7dt, more preferably 0.4dt<dr<0.6dt, as is found from the dependence of the voltage-reflectance (transmittance) of the transmission region and the reflection region on the thickness of the liquid crystal layer shown in FIG. 8. If the thickness of the liquid crystal layer in the reflection region is smaller than the lower limit, the reflectance will be 50% or less of the maximum reflectance, failing to provide sufficiently high reflectance. If the thickness dr of the liquid crystal layer in the reflection region is greater than the upper limit, the peak of the reflectance in the voltage-reflectance characteristics exists at a drive voltage different from that in the case of the transmission display. Also, the relative reflectance tends to be low at a white display voltage optimal for the transmission display. The reflectance is as low as 50% or less of the maximum reflectance, failing to provide sufficiently high reflectance. Since the optical length in the liquid crystal layer in the reflection region B is double that in the transmission region, the birefringence anisotropy (Δn) of the liquid crystal material and the panel cell thickness design are very important when the same design is made for both the transmission region and the reflection region.

EXAMPLE 1

Specific characteristics of the transflective LCD device of the embodiment according to the first aspect of the present invention will be described.

An LCD device having the construction shown in FIG. 7 was fabricated. As the liquid crystal cell 50, one having the same construction as the LCD device 200 shown in FIGS. 3A and 3B was used. A transparent dielectric layer having no light scattering function was formed as the transparent dielectric layer 234, and a resin layer having a continuous uneven surface was formed under the reflective electrode 211*b*, to adjust the diffuse reflection characteristics in the reflection display. The uneven surface was formed by the method described in Japanese Laid-Open Patent Publication No. 9-90426.

The openings 214 and the wall structure 215 in the LCD device 200 shown in FIGS. 3A and 3B were omitted, so that the alignment regulation was made with the supports 233. Cross-shaped supports (the shape of the supports 133 in FIG. 1A) were used as the supports 233. The supports 233 were formed on the counter substrate by photolithography using a negative photosensitive resin (for example, V-259PA (Nippon Steel Chemical Co., Ltd.)). The inclined sides were inversely tapered with respect to the counter substrate, and the tilt angle (angle formed between the substrate surface and the inclined side) was about 45°.

The vertical alignment films were formed using a known alignment film material by a known method. No rubbing was made. A liquid crystal material having negative dielectric anisotropy (Δn: 0.1 and Δε: −4.5) was used. In this example, the thicknesses dt and dr of the liquid crystal layer in the transmission region and the reflection region were set at 4 μm and 2.2 μm, respectively (dr=0.55dt).

The resultant liquid crystal cell was sandwiched between two orthogonal polarizing plates, and observed. As a result, it was confirmed that liquid crystal molecules near the supports continuously fell along the inclined sides of the supports during voltage application, forming axisymmetric liquid crystal domains.

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

The results of the visual angle—contrast characteristics in the transmission display are shown in FIG. 8. The viewing angle characteristics in the transmission display were roughly symmetric in all directions, the range CR>10 was as large as up to ±80°, and the transmission contrast was as high as 300:1 or more at the front.

As for the characteristics of the reflection display, the reflectance evaluated with a spectral calorimeter (CM2002 from Minolta Co., Ltd.) was about 8.4% (value in terms of the aperture ratio of 100%) with respect to a standard diffuse plate as the reference. The contrast value of the reflection display was 21, which was high compared with the case of the conventional LCD devices.

EXAMPLE 2

As in Example 1, an LCD device having the construction shown in FIG. 7 was fabricated using a liquid crystal cell having the same construction as the LCD device 200 shown in FIGS. 3A and 3B. A transparent dielectric layer having no light scattering function was formed as the transparent dielectric layer 234, and a resin layer having a continuous uneven surface was formed under the reflective electrode 211*b*, to adjust the diffuse reflection characteristics in the reflection display. The wall structure 215 was formed integrally with the resin layer (interlayer insulating film) formed under the reflective electrode 211*b* for imparting an uneven shape on the surface of the reflective electrode 211*b*.

Specifically, the active matrix substrate of this example was formed in the following manner.

First, a positive photosensitive resin layer was formed to cover the circuit elements such as TFTs under predetermined conditions. The photosensitive resin layer was exposed to light using a first photomask that shades portions corresponding to regions that are to be projections of an uneven shape and regions that are to be the wall structure under low-light conditions (80 mJ/cm$^2$), to thereby form the uneven shape on the surface of the regions of the photosensitive resin layer underlying the reflective electrodes and also form the wall structure (see the wall structure 215 in FIGS. 3A and 3B). Subsequently, for formation of contact holes, the photosensitive resin layer was exposed to light using a second photomask that is open for regions corresponding to the contact holes under high-light conditions (350 mJ/cm$^2$). Thereafter, a series of processing such as development, drying and baking followed. In this way, the interlayer insulating film and the wall structure were formed from the same photosensitive resin layer in a one-time photolithographic process including two exposure steps.

In the series of steps described above, the wall structure and the through holes electrically connecting to the underlying connection electrodes were formed together with the interlayer insulating film having fine uneven surface for imparting diffusion reflection characteristics in reflection display.

Thereafter, for formation of the pixel electrodes, a transparent electric film (ITO film) was formed on the flat surface of the interlayer insulating film under predetermined conditions, and a reflective electrode film was formed on the uneven surface of the interlayer insulating film by sputtering. In the patterning for the pixel electrodes, electrode openings (see the openings 214 in FIGS. 3A and 3B) for fixing/stabilizing the center axes of axisymmetric alignment were formed at predetermined positions.

Supports (wall spacers, see the supports 233 in FIGS. 3A and 3B) were formed at positions of the color filter substrate (counter substrate) corresponding to the shading region (region in which the wall structure was formed) of the active matrix substrate. The inclined sides of the supports were inversely tapered with respect to the counter substrate, and the tilt angle (angle formed between the substrate surface and the inclined side) was about 45°. A transparent dielectric layer was formed on the color filter substrate in each reflection region to give a step for adjusting the thickness of the liquid crystal layer in the reflection region.

Vertical alignment films were formed on the active matrix substrate and the color filter substrate under predetermined conditions (No rubbing was made), and the two substrates were bonded together via a sealing resin. A liquid crystal material having negative dielectric anisotropy ($\Delta n$: 0.1 and $\Delta\epsilon$: −4.5) was injected in the space between the two substrates and sealed, to obtain a liquid crystal cell. In this example, the thicknesses dt and dr of the liquid crystal layer in the transmission region and the reflection region were set at 4 μm and 2.1 μm, respectively.

The resultant liquid crystal cell was sandwiched between two orthogonal polarizing plates, and observed. As a result, it was confirmed that liquid crystal molecules near the supports and the wall structure continuously fell along the inclined sides during voltage application, forming axisymmetric liquid crystal domains.

Optical films were placed on the outer surfaces of the liquid crystal cell to obtain an LCD device.

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

The results of the visual angle—contrast characteristics in the transmission display are shown in FIG. 8. The viewing angle characteristics in the transmission display were roughly symmetric in all directions, the range CR>10 was as large as up to ±80°, and the transmission contrast was as high as 300:1 or more at the front.

As for the characteristics of the reflection display, the reflectance evaluated with a spectral colorimeter (CM2002 from Minolta Co., Ltd.) was about 8.2% (value in terms of the aperture ratio of 100%) with respect to a standard diffuse plate as the reference. The contrast value of the reflection display was 22, which was high compared with the case of the conventional LCD devices.

The response time for 90% change of the transmittance of the liquid crystal panel ($t_{ON}+t_{OFF}$ (ms); $t_{ON}$: time required for a change during 0V→4V voltage application, $t_{OFF}$: time required for a change during voltage 4V→0V) and the grayscale response time for 50% change of the transmittance (time required for a change from level 3 to level 5 in the eight levels of grayscale) were measured and compared between Examples 1 and 2. The results are as shown in the following table. The measurement temperature was 25° in both cases.

TABLE 1

|  | Response time (0 ↔ 4 V (ms)) | Grayscale response time (ms) |
| --- | --- | --- |
| Example 1 | 35 | 52 |
| Example 2 | 30 | 41 |

It was confirmed that in the LCD device of Example 2, which had the wall structure and the electrode openings 214 in addition to the alignment regulating force of the supports, the axisymmetric alignment was further stabilized and the effect of shorting the response time was great.

It was found that in both Examples 1 and 2, the shock resistance improved. For example, in a load test (1 kgf/cm$^2$) for liquid crystal panels, the time required to recover the original alignment from once-disturbed alignment due to application of a load was five minutes or less, proving that the LCDs had sufficient alignment recovery capability. The reason is presumably that in both examples the density of placement of the supports is higher than in conventional LCDs. In Example 2, naturally, the wall structure and the openings also contribute to this capability.

COMPARATIVE EXAMPLE 1

A liquid crystal display panel, having the same construction as the LCD device shown in FIGS. 3A and 3B except that the openings and the wall structure were omitted and the supports formed in Example 1 were used as the supports, was fabricated, and horizontal alignment films were used, to provide an ECB mode homogeneously aligned liquid crystal panel. A liquid crystal material having positive dielectric anisotropy ($\Delta n$: 0.07, $\Delta\epsilon$: 8.5) was used. The thickness dt and dr of the liquid crystal layer in the transmission regions and the reflection regions were 4.3 μm and 2.3 μm, respectively (dr=0.53dt).

Optical films each formed of a plurality of optical layers including a polarizing plate and a phase plate such as a quarter wave plate were placed on both surfaces of the liquid crystal display panel, to obtain an LCD device.

A drive signal was applied to the resultant LCD device (4V was applied across the liquid crystal layer) to evaluate the display characteristics by the same evaluation method as that described.

As the viewing angle characteristics in the transmission display, the range of CR>10 was up to ±30°, and reverse gradation was eminent. The transmission contrast was 140:1. As for the characteristics of the reflection display, the reflectance was about 9.3% (value in terms of the aperture ratio of 100%) with respect to a standard diffuse plate as the reference. The contrast value of the reflection display was 8, and the display image was white-blurred and low in contrast compared with the LCD devices of the examples according to the first aspect of the vertical alignment mode.

A load test was also conducted to examine the shock resistance under the same conditions as those for the above examples. As a result, an alignment disturbance was recognized after the test, indicating that the LCD device of the comparative example was poor in shock resistance compared with the above examples.

As described above, in the LCD devices according to the first aspect of the present invention, in which the vertical alignment mode was applied to transmission display and reflection display, a good contrast ratio was obtained both in the transmission display and the reflection display, compared with the conventional homogeneously aligned LCD devices and the conventionally known technologies. Also, since the supports (wall spacers) for defining the thickness of the liquid crystal layer are used for alignment regulation, no additional step for providing an alignment regulating structure is necessary. Since the supports are regularly provided at a sufficiently high density, the shock resistance improves.

In addition, by placing the structures for controlling the alignment of liquid crystal domains (the wall structure and the openings) only on one substrate (in the illustrated examples, on the active matrix substrate), the alignment of liquid crystal domains can be further stabilized, and thus viewing angle characteristics wide in all directions can be attained. Moreover, since the position of the center axes of the domains can be fixed/stabilized with the openings, the effect of improving the uniformity of display at slanting visual angles can be obtained.

Next, the construction and operation of LCD devices according to the second aspect of the present invention will be described.

In the LCD devices according to the second aspect of the present invention, at least one pixel region is divided into a plurality of sub-pixel regions with a dielectric structure (protrusions). Liquid crystal molecules in the liquid crystal layer in each sub-pixel region are axisymmetrically aligned during voltage application. In the following description, the region corresponding to each of a plurality of axisymmetrically aligned domains formed in each pixel is called as the "sub-pixel region".

In a preferred embodiment, a wall structure substantially surrounding each pixel region is formed in a shading region. The dielectric protrusions and the wall structure may be formed integrally, or may be formed of a same dielectric material, or otherwise may be formed of different patterning materials.

One object of the second aspect of the present invention is to suppress display failure due to poor alignment occurring after disturbance in alignment with pressing of the liquid crystal panel and improve the display, and this object is attained by separating the regions of liquid crystal domains from each other with the dielectric protrusions and the wall structure. To state specifically, in the event of a collapse of axisymmetric alignment with pressing of the display screen, stabilizing the alignment is attempted from the peripheries of the divided liquid crystal domains with the action of the wall structure and the dielectric protrusions formed around the liquid crystal domains. In other words, the wall structure and the dielectric protrusions impart the force of recovering the disturbed alignment to the liquid crystal domains.

Operation Principle

Figure 9A:
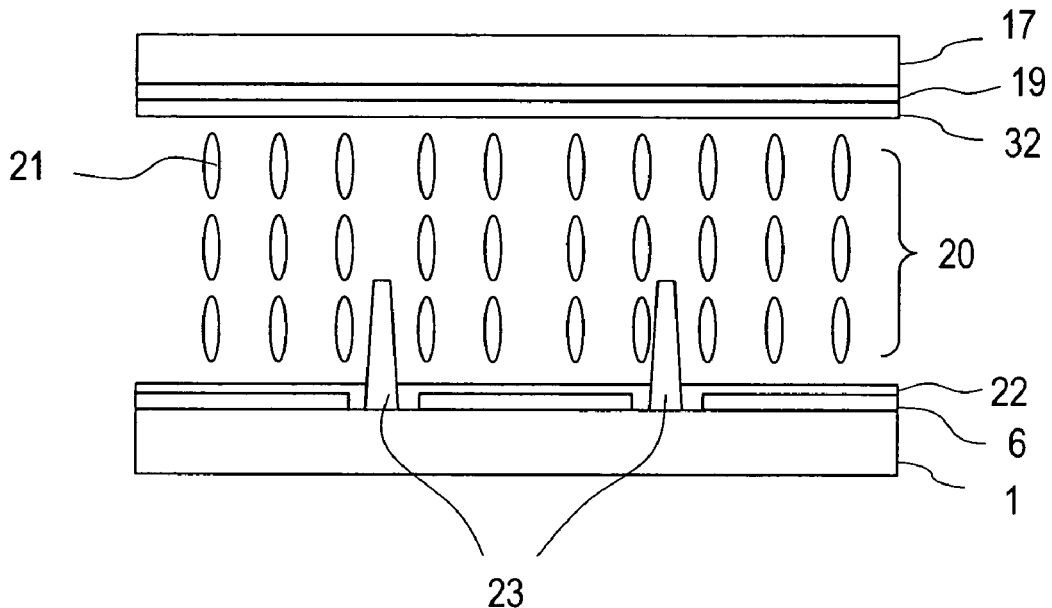
FIGS. 9A and 9B are diagrammatic views for demonstrating the operation principle of LCD devices of the present invention, showing the aligned states of liquid crystal molecules during non-voltage application (FIG. 9A) and during voltage application (FIG. 9B).
Figure 9B:
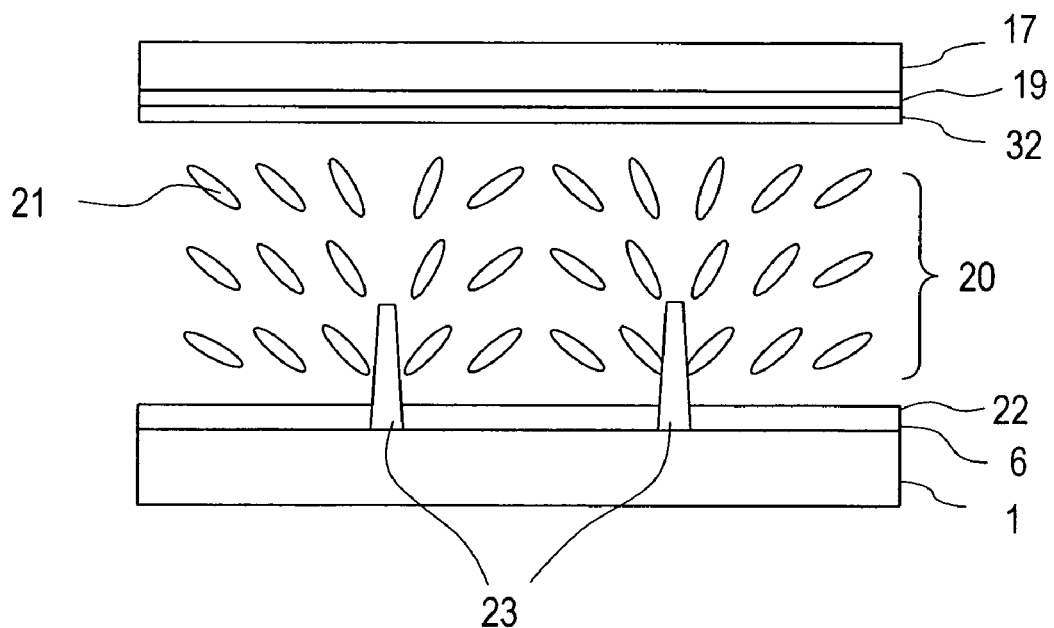

The reason why the LCD device having a vertically aligned liquid crystal layer of the present invention has excellent wide viewing angle characteristics will be described with reference to FIGS. 9A and 9B. FIGS. 9A and 9B are views for demonstrating how the alignment regulating force of dielectric protrusions 23 and a wall structure formed around a pixel electrode 6 act, in which the aligned states of liquid crystal molecules during non-voltage application (FIG. 9A) and during voltage application (FIG. 9B) are diagrammatically shown. The state shown in FIG. 9B is for display of a gray-scale level.

The LCD device shown in FIGS. 9A and 9B includes an insulating film (not shown), a pixel electrode 6 having the dielectric protrusions 23 and a wall structure, and a vertical alignment film 22 formed in this order on a transparent substrate 1. The LCD device also includes a color filter layer (not shown), a counter electrode 19 and an alignment film 32 formed in this order on another transparent substrate 17. A liquid crystal layer 20 interposed between the two substrates includes liquid crystal molecules 21 having negative dielectric anisotropy. Although not shown in FIGS. 9A and 9B, the vertical alignment film 22 also covers the dielectric protrusions 23.

As shown in FIG. 9A, during non-voltage application, the liquid crystal molecules 21 are aligned roughly vertical to the substrate surface with the alignment regulating force of the vertical alignment films 22 and 32. During voltage application, as shown in FIG. 9B, the liquid crystal molecules 21 having negative dielectric anisotropy attempt to make their major axes vertical to electric lines of force, and tilt in directions along equipotential lines (parallel to equipotential lines) affected by an electric field. Thus, an axisymmetrically aligned domain is formed as a result of the alignment of the liquid crystal molecules 21 tilting in the inclined direction of the electric field and also the alignment of the liquid crystal molecules tilting near the side steps of the dielectric protrusions 23 or the side steps of the wall structure. In the axisymmetrically aligned domain, the liquid crystal directors point to all azimuth directions (directions in the substrate plane), and thus the resultant LCD exhibits excellent viewing angle characteristics.

In this embodiment, the wall structure and the dielectric protrusions are provided around at least part of each liquid crystal domain. This stabilizes the tilting of liquid crystal molecules on the sides of the wall structure and the dielectric protrusions, and also serves to reduce poor alignment due to a disturbance in alignment after pressing of the panel plane. Specifically, the alignment of liquid crystal molecules in the liquid crystal domain is less disturbed and the disturbed axisymmetrically aligned domain is effectively recovered, compared with the conventional methods in which the electroclinic direction of liquid crystal molecules is regulated with the action of an electric field generated when a voltage is applied to a slit electrode. As a result, display roughness can be greatly improved.

The wall structure and the dielectric protrusions in this embodiment are provided at predetermined positions by regularly patterning a photosensitive resin via photolithography. In this embodiment, the wall structure and the dielectric protrusions may be formed of a same material, or may be formed of different materials as required.

In an embodiment according to the second aspect of the present invention, each of a plurality of pixel regions is defined by a first electrode (for example, a pixel electrode) and a second electrode. At least one pixel region, among the plurality of pixel regions, is divided into a plurality of sub-pixel regions with regularly arranged dielectric protrusions and a wall structure formed in a shading region. The tilt direction of liquid crystal molecules in a portion of the liquid crystal layer (liquid crystal domain) in each sub-pixel region is regulated with the side steps of the dielectric protrusions and the side steps of the wall structure during voltage application, to assume axisymmetric alignment. With the existence of the dielectric protrusions and the wall structure surrounding at least part of the liquid crystal domain, the aligned state can be suppressed from changing when the panel plane is pressed. Also, degradation in display quality that may otherwise occur due to variations in axial position and changes in axisymmetric alignment can be prevented. In particular, by providing the wall structure in a shading region, decrease in pixel effective aperture ratio can be prevented. Light leakage that may occur if the wall structure is provided in the pixel region can also be prevented, and this can suppress decrease in contrast ratio. Thus, the display quality will not be sacrificed.

In another embodiment, the first electrode and/or the second electrode have openings regularly provided at predetermined positions in the sub-pixel region. Since the opening serves to fix the position of the center axis of axisymmetric alignment, the axisymmetric alignment is more stabilized.

In application of the present invention to a transflective LCD device, the dielectric protrusions may be placed near the boundary between a transmission region and a reflection region. This separates liquid crystal domains in the transmission region and the reflection regions from each other, and thus the aligned state can be stabilized more easily.

An LCD device of an embodiment according to the second aspect of the present invention will be described specifically with reference to the relevant drawings. Although an active matrix LCD device using thin film transistors (TFTS) will be exemplified in this embodiment, the present invention is not limited to this type, but is also applicable to MIM (metal insulator metal) active matrix LCD devices and simple matrix LCD devices. Also, although a transmissive LCD device and a transflective LCD device (also called transmissive/reflective LCD device) are exemplified in this embodiment, the present invention is not limited to these types, but is also applicable to reflective LCD devices and semitransparent LCD devices using a semitransparent film such as a half mirror.

As used herein, the region of the LCD device corresponding to the "pixel" as the minimum unit of display is called a "pixel region". In color LCD devices, three pixels of red, green and blue, for example, constitute one "picture element". In active matrix LCD devices, the pixel region is defined by a pixel electrode and the portion of the counter electrode facing the pixel electrode. In simple matrix LCD devices, the pixel region is defined by the portion of a stripe-shaped column electrode and the portion of a row electrode running orthogonal to the column electrode that cross each other. In LCD devices having a shading layer such as a black matrix, the pixel region strictly corresponds to the portion corresponding to an opening of the black matrix out of the region across which a voltage is applied depending on the display state.

Transmissive LCD Device

A transmissive LCD device 300 of an embodiment of the present invention will be described with reference to FIGS. 10A and 10B. FIGS. 10A and 10B diagrammatically show one pixel of the transmissive LCD device 300, in which FIG. 10A is a plan view as is viewed in the direction normal to the substrate plane and FIG. 10B is a cross-sectional view taken along line 10B-10B' in FIG. 10A.

The LCD device 300 includes a transparent substrate (for example, a glass substrate) 310a, a transparent substrate 310b placed to face the transparent substrate 310a, and a vertically aligned liquid crystal layer 320 interposed between the transparent substrates 310a and 310b. Vertical alignment films (not shown) are formed on the surfaces of the substrates 310a and 310b facing the liquid crystal layer 320. During non-voltage application, therefore, liquid crystal molecules in the liquid crystal layer 320 are aligned roughly vertical to the surfaces of the vertical alignment films. The liquid crystal layer 320 includes a nematic liquid crystal material having negative dielectric anisotropy and also includes a chiral agent as required.

The LCD device 300 further includes pixel electrodes 311 formed on the transparent substrate 310a and a counter electrode 331 formed on the transparent substrate 310b. Each pixel electrode 311, the counter electrode 331 and the liquid crystal layer 320 interposed between these electrodes define a pixel. In the illustrated example, both the pixel electrodes 311 and the counter electrode 331 are formed of a transparent conductive film such as an indium tin oxide (ITO) film, for example. Typically, color filters 330 (the entire of the plurality of color filters of plural colors may also be called a color filter layer 330) provided for the respective pixels, as well as a black matrix (shading layer) 332 formed in the gaps between the adjacent color filters 330, are formed on the surface of the transparent substrate 310b facing the liquid crystal layer 320, and the counter electrode 331 is formed on the color filters 330 and the black matrix 332. Alternatively, the color filters 330 and the black matrix 332 may be formed on the counter electrode 331 (on the surface thereof facing the liquid crystal layer 320).

In this embodiment, a pixel region in the shape of a rectangle having a pair of longer sides and a pair of shorter sides as is viewed from top (in the direction normal to the substrate plane) is defined by the pixel electrode 311 and the counter electrode 331. A wall structure 315 substantially surrounding the pixel region and a pair of dielectric protrusions 316 are formed around the pixel region on the transparent substrate 310a. The pair of dielectric protrusions 316 are formed in roughly the centers of the longer sides of the pixel region in line with each other in the shorter-side direction (direction of extension of the shorter sides), and extend from near the longer sides of the pixel region (from the inner sides of the wall structure 315) in the direction closer to each other. The length of the dielectric protrusions 316 (in the shorter-side direction) is about one-third or less of the length of the shorter sides of the pixel region, although the length is preferably 5 µm or more. If the length of the dielectric protrusions 316 is less than 5 µm, the dividing effect of the dielectric protrusions 316 is small and thus the alignment regulating force may decrease. The height of the wall structure 315 and the dielectric protrusions 316 is preferably equal to or less than a half of the cell thickness (the distance between the substrates 310a and 310b or the thickness of the liquid crystal layer 320) in consideration of easiness of injection of the liquid crystal material. If the height of the wall structure 315 and the dielectric protrusions 316 is less than 0.5 µm, the alignment regulating force decreases and this may decrease the display contrast ratio. Hence, the height of the wall structure 315 and the dielectric protrusions 316 is preferably 0.5 µm or more. The pixel region is divided into two sub-pixel regions with the wall structure 315 and the pair of dielectric protrusions 316. In other words, the liquid crystal layer 320 in the pixel region is divided into two liquid crystal domains.

In this embodiment, the pixel electrode 311 has two openings 314 formed at predetermined positions. Specifically, each opening 314 is formed roughly in the center of each sub-pixel region. When a predetermined voltage is applied across the liquid crystal layer 320, two liquid crystal domains (sub-pixel regions) each exhibiting axisymmetric alignment are formed. The center axis of the axisymmetric alignment of each of the liquid crystal domains is located in or near the opening 314. In other words, the opening 314 formed in the pixel electrode 311 acts to fix the position of the center axis of the axisymmetric alignment.

Moreover, side steps 316a of the dielectric protrusions 316 and side steps 315a of the wall structure 315 serve to define the tilt directions of the liquid crystal molecules, and also serve to form stable axisymmetrically aligned domains in the sub-pixel regions. When the dielectric protrusions 316 are formed in the pixel region, shading portions are formed to correspond to at least the regions of the dielectric protrusions 316, preferably to the regions of the dielectric protrusions 316 and their neighboring regions. Such shading portions may not necessarily be part of the black matrix, but may be elements that do not transmit light such as part of a storage capacitance line. Otherwise, to stabilize the axisymmetrically aligned domains, cuts 313 may be formed in the pixel electrode 311 to surround the dielectric protrusions 316. With such cuts, the electroclinic effect with an inclined electric field during voltage application can also be used.

The shape of the openings 314 formed for fixing of the center axes of the axisymmetrically aligned domains is preferably circular as illustrated, but is not limited to this. To exert roughly equal alignment regulating force in all directions, however, the shape is preferably a polygon having four or more sides and more preferably a regular polygon.

The LCD device 300 of this embodiment has a shading region between the adjacent pixels. In other words, the pixel region is surrounded by a shading region as is viewed from top. The wall structure 315 is placed on the transparent substrate 310a in the shading region. The shading region as used herein refers to a region that does not contribute to display, formed around the pixel electrode 311 on the transparent substrate 310a. For example, the shading region is a region shaded from light due to the presence of TFTs, gate signal lines and source signal lines formed on the transparent substrate 310a, or a region shaded from light due to the presence of the black matrix formed on the transparent substrate 310b. Since the shading region does not contribute to display, the wall structure 315 formed in the shading region is free from adversely affecting the display.

The wall structure 315 in this embodiment is shown as a continuous wall surrounding the pixel region, but is not limited to this. The wall structure 315 is just required to substantially surround the pixel region, and may be composed of a plurality of separate walls, for example. The wall structure 315, which defines liquid crystal domains (a pixel region), should preferably have a length of some extent. For example, when the wall structure 315 is composed of a plurality of walls, each wall is preferably longer than the gap between the adjacent walls.

Supports 333 for defining the thickness dt of the liquid crystal layer 320 (also called the cell gap) are preferably formed in the shading region (in the illustrated example, the region defined by the black matrix 332) to avoid degradation in display quality due to the supports. Although the supports 333 are formed on the wall structure 315 provided in the shading region in the example in FIG. 10B, the supports 333 may be formed on either transparent substrate 310a or 310b. In the case of forming the supports 333 on the wall structure 315, setting is made so that the sum of the height of the wall structure 315 and the height of the supports 333 is equal to the thickness of the liquid crystal layer 320. If the supports 333 are formed in a region having no wall structure 315, setting is made so that the height of the supports 333 is equal to the thickness dt of the liquid crystal layer 320.

The LCD device 300 of this embodiment can be fabricated using a general technique such as photolithography. For example, the wall structure 315, the dielectric protrusions 316 and the supports 333 can be formed in the following procedure. First, TFTs, gate signal lines, source signal lines, pixel electrodes 311 having the openings 314 and the like are formed on the substrate 310a by photolithography. A photosensitive resin film is then formed on the resultant substrate, and patterned to form the wall structure 315 and the dielectric protrusions 316. The supports 333 are then formed by photolithography using a photosensitive resin. Thereafter, a vertical alignment film (not shown) is formed covering the pixel electrodes 311, the wall structure 315 and the dielectric protrusions 316.

In the LCD device 300 of this embodiment, when a predetermined voltage (voltage equal to or higher than a threshold voltage) is applied between the pixel electrode 311 and the counter electrode 331, two axisymmetrically aligned domains of which the center axes are stabilized in or near the two openings 314 are formed. The pair of dielectric protrusions 316 provided in the center portion of the pixel electrode 311 in the length direction define the directions of tilt of the liquid crystal molecules in the two separated liquid crystal domains adjacent to each other in the length direction. The wall structure 315 is formed around the pixel electrode 311 and near the dielectric protrusions 316. The directions of tilt of the liquid crystal molecules near the wall structure 315 in the pixel region are defined with the synergistic effect of the dielectric protrusions 316 and the wall structure 315. The alignment regulating forces of the openings 314, the dielectric protrusions 316 and the wall structure 315 are considered to act cooperatively, to thereby stabilize the alignment of the liquid crystal domain.

On the surface of the transparent substrate 310a facing the liquid crystal layer 320, provided are active elements such as TFTs and circuit elements such as gate signal lines and source signal lines connected to TFTs (all of these elements are not shown). Herein, the transparent substrate 310a, together with the circuit elements and the pixel electrodes 311, the wall structure 315, the supports 333, the alignment film and the like described above formed on the transparent substrate 310a, are collectively called an active matrix substrate in some cases. Likewise, the transparent substrate 310b, together with the color filter layer 330, the black matrix 332, the counter electrode 331, the alignment film and the like formed on the transparent substrate 310b, are collectively called a counter substrate or a color filter substrate in some cases.

Although omitted in the above description, the LCD device 300 further includes a pair of polarizing plates placed to face each other via the transparent substrates 310*a* and 310*b*. The polarizing plates are typically placed so that their transmission axes are orthogonal to each other. The LCD device 300 may further include a biaxial optical anisotropic medium layer and/or a uniaxial optical anisotropic medium layer between the transparent substrate 310*a* and one of the pair of polarizing plates and/or between the transparent substrate 310*b* and the other polarizing plate, as will be described later.

Transflective LCD Device

Figure 11A:
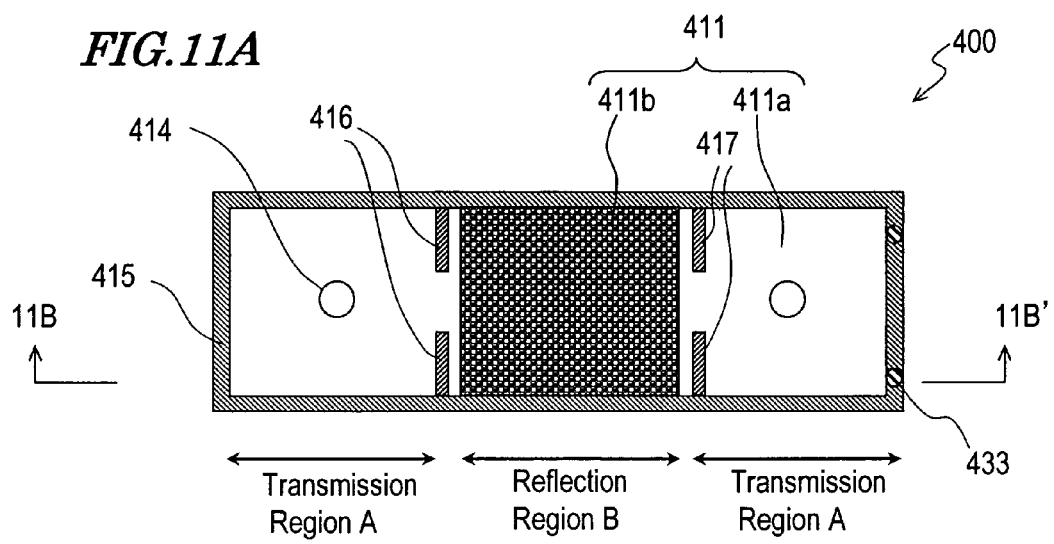
Figure 11B:
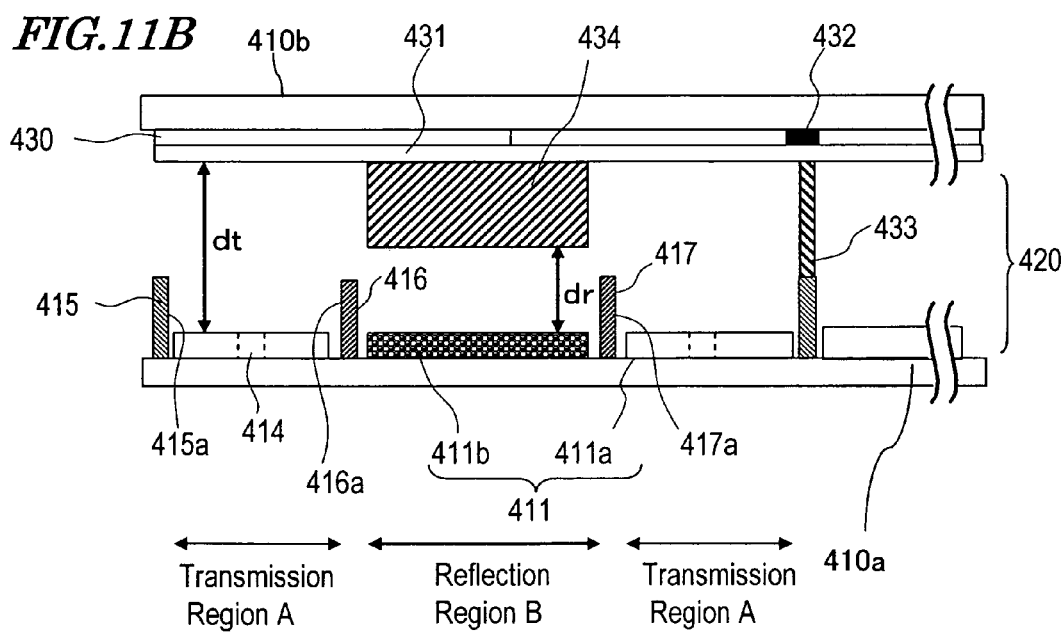

A transflective LCD device 400 of an embodiment of the present invention will be described with reference to FIGS. 11A and 11B. FIGS. 11A and 11B diagrammatically show one pixel of the transflective LCD device 400, in which FIG. 11A is a plan view as is viewed in the direction normal to the substrate plane and FIG. 11B is a cross-sectional view taken along line 11B-11B' in FIG. 11A.

The LCD device 400 includes a transparent substrate (for example, a glass substrate) 410*a*, a transparent substrate 410*b* placed to face the transparent substrate 410*a*, and a vertically aligned liquid crystal layer 420 interposed between the transparent substrates 410*a* and 410*b*. Vertical alignment films (not shown) are formed on the surfaces of the substrates 410*a* and 410*b* facing the liquid crystal layer 420. During non-voltage application, therefore, liquid crystal molecules in the liquid crystal layer 420 are aligned roughly vertical to the surfaces of the vertical alignment films. The liquid crystal layer 420 includes a nematic liquid crystal material having negative dielectric anisotropy and also includes a chiral agent as required.

The LCD device 400 further includes pixel electrodes 411 formed on the transparent substrate 410*a* and a counter electrode 431 formed on the transparent substrate 410*b*. Each pixel electrode 411, the counter electrode 431 and the liquid crystal layer 420 interposed between these electrodes define a pixel. Circuit elements such as TFTs are formed on the transparent substrate 410*a* as will be described later. Herein, the transparent substrate 410*a* and the components formed thereon are collectively called an active matrix substrate 410*a* in some cases.

Typically, color filters 430 (the entire of the plurality of color filters of plural colors may also be called a color filter layer 430) provided for the respective pixels, as well as a black matrix (shading layer) 432 provided in the gaps between the adjacent color filters 430, are formed on the surface of the transparent substrate 410*b* facing the liquid crystal layer 420, and the counter electrode 431 is formed on the color filters 430 and the black matrix 432. Alternatively, the color filters 430 and the black matrix 432 may be formed on the counter electrode 431 (on the surface thereof facing the liquid crystal layer 420). Herein, the transparent substrate 410*b* and the components formed thereon are collectively called a counter substrate (color filter substrate) 410*b* in some cases.

In this embodiment, each pixel electrode 411 includes a transparent electrode 411*a* formed of a transparent conductive film (for example, an ITO film) and a reflective electrode 411*b* formed of a metal film (for example, an Al layer, an alloy layer including Al, and a layered film including any of these layers). Having such a pixel electrode, each pixel region includes a transmission region A defined by the transparent electrode 411*a* and a reflection region B defined by the reflective electrode 411*b*, to provide display in the transmission mode and display in the reflection mode, respectively.

In this embodiment, a pixel region in the shape of a rectangle having a pair of longer sides and a pair of shorter sides as is viewed from top is defined by the pixel electrode 411 and the counter electrode 431. A wall structure 415 substantially surrounding the pixel region and two pairs of dielectric protrusions 416 and 417 are formed around the pixel region on the transparent substrate 410*a*. The two pairs of dielectric protrusions 416 and 417 are formed at positions trisecting the longer sides of the pixel region each in line with each other in the shorter-side direction (direction of extension of the shorter sides), and extend from near the longer sides of the pixel region (from the inner sides of the wall structure 415) in the direction closer to each other. As in the LCD device 300, the wall structure 415 substantially surrounding the pixel region is formed around the pixel region on the transparent substrate 410*a*. The length of the dielectric protrusions 416 and 417, and the heights of the dielectric protrusions and the wall structure 415 are as described in relation to the LCD device 300. The pixel region is divided into three sub-pixel regions with the wall structure 415 and the two pairs of dielectric protrusions 416 and 417. In other words, the liquid crystal layer 420 in the pixel region is divided into three liquid crystal domains. Two out of the three sub-pixel regions are transmission regions A and one is a reflection region B. In this embodiment, the two transmission regions A sandwich one sub-pixel region in the length direction as is viewed from top.

In this embodiment, the pixel region 411 has three openings 414 at predetermined positions (two in the transmission regions A and one in the reflection region B). Specifically, each opening 414 is formed roughly in the center of each sub-pixel region. When a predetermined voltage is applied across the liquid crystal layer 420, three liquid crystal domains (sub-pixel regions) each exhibiting axisymmetric alignment are formed. The center axis of the axisymmetric alignment of each of the liquid crystal domains is located in or near the opening 414. In other words, the opening 414 formed in the pixel electrode 411 acts to fix the position of the center axis of the axisymmetric alignment.

Moreover, side steps 416*a* and 417*a* of the dielectric protrusions 416 and 417 and side steps 415*a* of the wall structure 415 serve to define the tilt directions of the liquid crystal molecules, and also serve to form stable axisymmetrically aligned domains in the sub-pixel regions. When the dielectric protrusions 416 and 417 are formed in the pixel region, shading portions are formed to correspond to at least the regions of the dielectric protrusions 416 and 417, preferably to the regions of the dielectric protrusions 416 and 417 and their neighboring regions. Such shading portions may not necessarily be part of the black matrix, but may be elements that do not transmit light such as part of storage capacitance lines. Otherwise, to stabilize the axisymmetrically aligned domains, cuts (not shown) may be formed in the pixel electrode 411 to surround the dielectric protrusions 416 and 417. With such cuts, the electroclinic effect with an inclined electric field during voltage application can also be used.

In this embodiment, the transmission region A and the reflection region B are arranged alternately in the display region of one pixel to form the pixel electrode. Also, two pairs of dielectric protrusions 416 and 417 are provided in the pixel division portions near the boundaries between the transmission region A and the reflection region B to form liquid crystal division regions. As a result, two liquid crystal domains are formed in the transmission regions A and one liquid crystal domain is formed in the reflection region B. Note however that this embodiment is merely illustrative and the present invention is not limited to this. Preferably, the shape of the liquid crystal domains is roughly a square from the standpoint of the viewing angle characteristics and the stability of alignment.

Figure 12A:
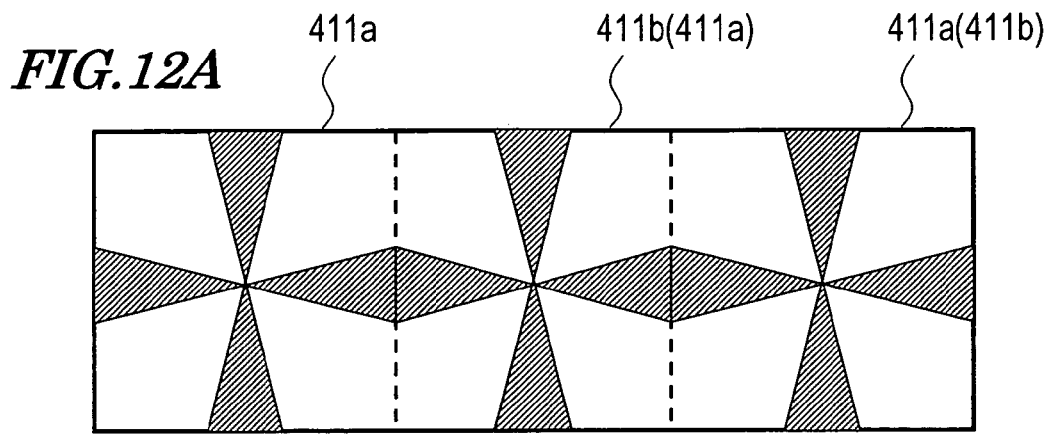
Figure 12B:
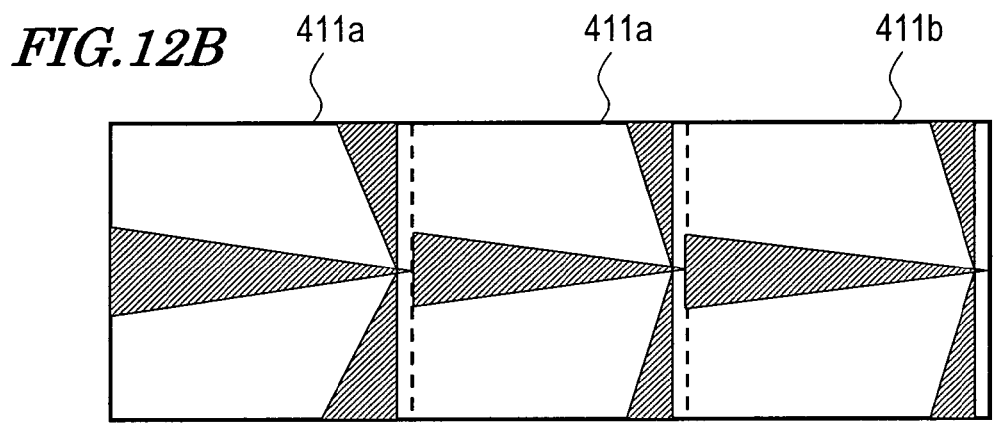
Figure 12C:
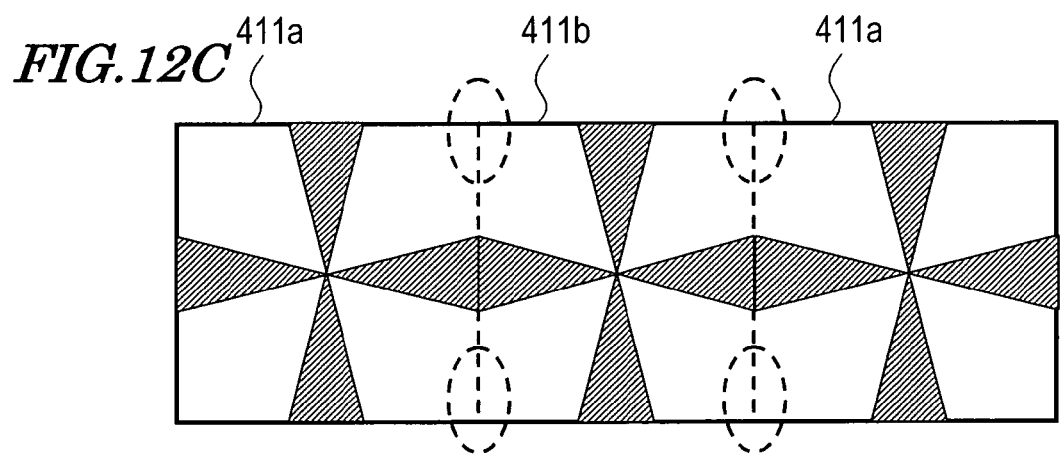

FIGS. 12A to 12C are diagrammatic views of axisymmetrically aligned states observed in the embodiment of the present invention and a conventional LCD device, in which FIG. 12A shows the alignment of liquid crystal domains in the steady state before pressing of the display plane, FIG. 12B shows the alignment after pressing in a conventional pixel-divided panel, and FIG. 12C shows the alignment after pressing in the pixel-divided panel of the embodiment of the present invention. The ellipses in FIG. 12C indicate existence of dielectric protrusions.

In this embodiment, the transmission region A and the reflection region B are arranged alternately (to be adjacent to each other), and the liquid crystal layer in the pixel region is divided into three with the dielectric protrusions and the wall structure (not shown) to form three liquid crystal domains. This enables uniform division into the liquid crystal domains with the dielectric protrusions and the wall structure, and therefore when the panel plane is pressed, a temporarily disturbed axisymmetrically aligned state is prevented from appearing in the adjacent pixels and is restored to the original good axisymmetrically aligned state. Thus, compared with the case of FIG. 12B in which one pixel region is divided into three in the arrangement of transmission region/transmission region/reflection region having transmission regions successively, it has been confirmed that a temporarily disturbed axisymmetrically aligned state is immediately restored to the original stable axisymmetric alignment.

The LCD device 400 of this embodiment has a shading region between the adjacent pixels. In other words, the pixel region is surrounded by a shading region as is viewed from top. The wall structure 415 is placed on the transparent substrate 410a in the shading region. Since the shading region does not contribute to display, the wall structure 415 formed in the shading region is free from adversely affecting the display.

The wall structure 415 in this embodiment is shown as a continuous wall surrounding the pixel region, but is not limited to this. The wall structure 415 is just required to substantially surround the pixel region, and may be composed of a plurality of separate walls, for example. The wall structure 415, which defines liquid crystal domains (a pixel region), should preferably have a length of some extent. For example, when the wall structure 415 is composed of a plurality of walls, each wall is preferably longer than the gap between the adjacent walls.

Supports 433 for defining the thickness dt of the liquid crystal layer 420 (also called the cell gap) are preferably formed in the shading region (in the illustrated example, the region defined by the black matrix 432) to avoid degradation in display quality due to the supports. Although the supports 433 are formed on the wall structure 415 provided in the shading region as shown in FIG. 11B, the supports 433 may be formed on either transparent substrate 410a or 410b. In the case of forming the supports 433 on the wall structure 415, setting is made so that the sum of the height of the wall structure 415 and the height of the supports 433 is equal to the thickness of the liquid crystal layer 420. If the supports 433 are formed in a region having no wall structure 415, setting is made so that the height of the supports 433 is equal to the thickness dt of the liquid crystal layer 420.

In the LCD device 400 of this embodiment, when a predetermined voltage (voltage equal to or higher than a threshold voltage) is applied between the pixel electrode 411 and the counter electrode 431, three axisymmetrically aligned domains of which the center axes are stabilized in or near the three openings 414 are formed. The directions of tilt of the liquid crystal molecules are defined in the regions partitioned with the dielectric protrusions 416 and 417 and the wall structure 415 formed around the pixel electrode 411, forming liquid crystal domains.

Next, a preferred construction specific to the transflective LCD device 400 permitting both the transmission-mode display and the reflection-mode display will be described. While light used for display passes through the liquid crystal layer 420 once in the transmission-mode display, it passes through the liquid crystal layer 420 twice in the reflection-mode display. Accordingly, as diagrammatically shown in FIG. 11B, the thickness dt of the liquid crystal layer 420 in the transmission region A is preferably set roughly double the thickness dr of the liquid crystal layer 420 in the reflection region B. By setting in this way, the retardation given to the light by the liquid crystal layer 420 can be roughly the same in both display modes. Most preferably, dr=0.5dt should be satisfied, but good display is secured in both display modes as long as 0.3dt<dr<0.7dt is satisfied. Naturally, dt=dr may be satisfied depending on the use.

In the LCD device 400, a transparent dielectric layer 434 is provided on the glass substrate 410b only in the reflection region B to make the thickness of the liquid crystal layer 420 in the reflection region B smaller than that in the transmission region A. This construction eliminates the necessity of providing a step by forming an insulating film and the like under the reflective electrode 411b, and thus has the advantage of simplifying the fabrication of the active matrix substrate 410a. If the reflective electrode 411b is formed on such an insulting film provided to give a step for adjusting the thickness of the liquid crystal layer 420, light used for transmission display will be shaded with the reflective electrode covering a slope (tapered face) of the insulating film, and light reflected from the reflective electrode formed on a slope of the insulating film will repeat internal reflection, failing to be effectively used for reflection display. By adopting the construction described above, occurrence of such problems is prevented, and thus the light use efficiency can be improved.

If the transparent dielectric layer 434 is provided with a function of scattering light (diffuse reflection function), good white display close to paper white can be realized without the necessity of providing the reflective electrode 411b with the diffuse reflection function. Such white display close to paper white can also be realized by making the surface of the reflective electrode 411b uneven, and in this case, no light scattering function is necessary for the transparent dielectric layer 434. However, the uneven surface may fail to stabilize the position of the center axis of the axisymmetric alignment depending on the shape of the uneven surface. On the contrary, by combining the transparent dielectric layer 434 having the light scattering function and the reflective electrode 411b having a flat surface, the position of the center axis can be stabilized with the opening 414 formed in the reflective electrode 411b more reliably. The following method, for example, may be adopted to provide the transparent dielectric layer 434 with the light scattering function. Ultrafine particles such as titanium oxide particles are dispersed in a transparent resin. The resultant resin is applied to a support such as a polyimide film, to form a scattering layer having a light scattering function. The scattering characteristics can be changed by changing the particle density, the particle size, the thickness of the scattering layer, the refractive index of the resin and the like. As another method, thin films different in refractive index may be formed one on top of another to form a light scattering layer.

Note that in the case of making the surface of the reflective electrode 411b uneven to provide the reflective electrode 411b with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 430 once in the transmission mode, it passes through the color filter layer 430 twice in the reflection mode. Accordingly, if the color filter layer 430 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged.

In the transflective LCD device of this embodiment, also, the active matrix substrate described with reference to FIGS. 4 and 5 can be suitably used.

As described above, the LCD device 400 shown in FIGS. 11A and 11B exhibits the effect of stabilizing the alignment of liquid crystal molecules sufficiently with a comparatively simple construction in which the alignment control structure for axisymmetric alignment (the openings 414 formed in the pixel electrode 411, the dielectric protrusions 416 and 417 and the wall structure 415) is formed on only the substrate 410a. Also, with the placement of the transparent dielectric layer 434 and/or the color filter layer 430 in the manner described above, the display brightness and color purity in both the transmission mode and the reflection mode can be improved.

The specific construction of the transflective LCD device of this embodiment can be that described above with reference to FIG. 7.

Figure 13:
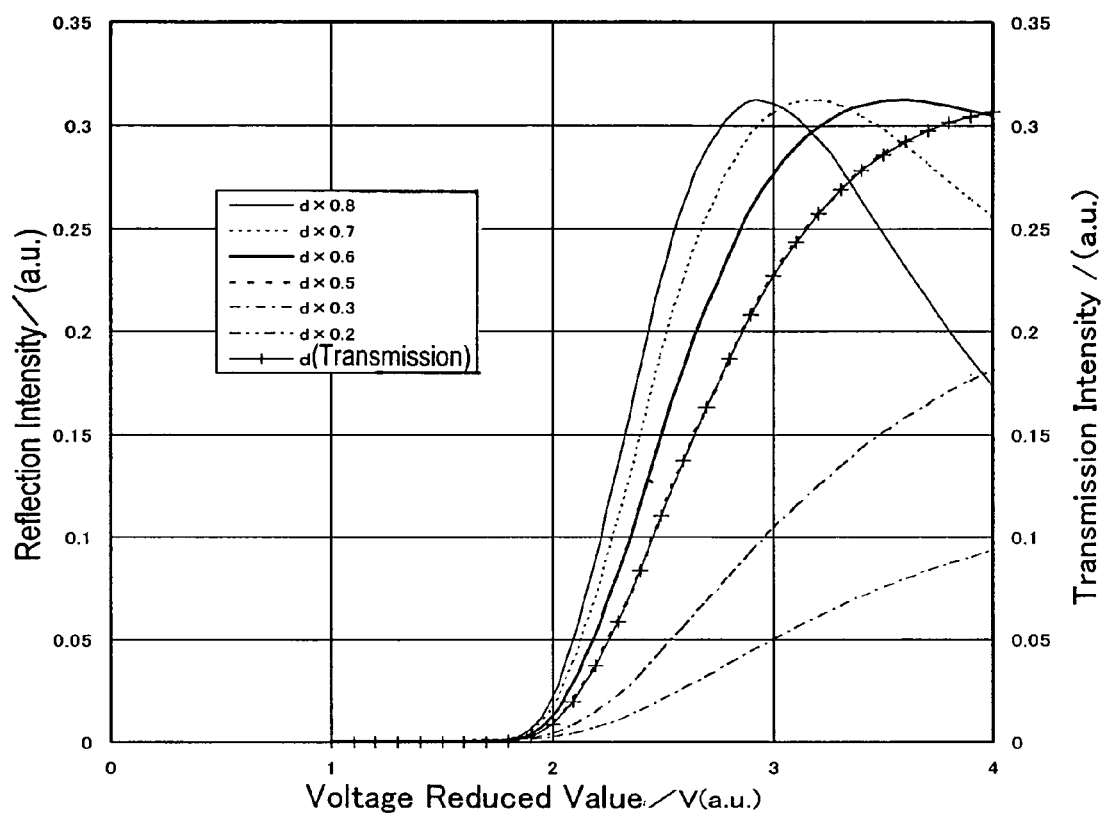
FIG. 13 is a graph showing the voltage-reflectance (transmittance) of a transmission region and a reflection region in a transflective LCD device of an embodiment according to the second aspect of the present invention.

Relationship Between the Thicknesses dt and dr of the Liquid Crystal Layer in the Transmission Region and the Reflection Region FIG. 13 is a graph showing the voltage-reflectance (transmittance) of the transmission region and the reflection region in the LCD device of this embodiment. As shown in FIG. 13, the thicknesses dt and dr in the transmission region and the reflection region preferably satisfy 0.3dt<dr<0.7dt, more preferably 0.4dt<dr<0.6dt. If the thickness dr of the liquid crystal layer in the reflection region is smaller than the lower limit, the reflectance will be 50% or less of the maximum reflectance, failing to provide sufficiently high reflectance. If the thickness dr is greater than the upper limit, a maximum of the reflectance in the voltage-reflectance characteristics exists at a drive voltage different from that in the transmission display. Also, the reflectance tends to be relatively low at a white display voltage optimal for the transmission display. The reflectance is as low as 50% or less of the maximum reflectance in some cases, failing to provide sufficiently high reflectance. Since the optical length in the liquid crystal layer in the reflection region is about twice as large as that in the transmission region, the birefringence anisotropy ($\Delta n$) of the liquid crystal material and the panel cell thickness design are very important when the same optical design is made for both the transmission region A and the reflection region B. This also applies to the transflective LCD device according to the first aspect of the present invention.

EXAMPLE

Specific characteristics of the transflective LCD device of this embodiment will be described.

An LCD device having the construction shown in FIG. 7 was fabricated. As the liquid crystal cell 50, one having the same construction as the LCD device 400 shown in FIGS. 11A and 11B was used. A transparent dielectric layer having no light scattering function was formed as the transparent dielectric layer 434, and a resin layer having a continuous uneven surface was formed under the reflective electrode 411b, to adjust the diffuse reflection characteristics in the reflection display.

The pixel region in this example is divided into three sub-pixel regions with the wall structure and the dielectric protrusions, and has a transmission region, a reflection region and a transmission region in this order in the length direction. The wall structure is formed on a shading layer formed in the non-display region (region other than the pixel region). Thus, an axisymmetrically aligned domain is formed in each region during voltage application.

The vertical alignment films were formed using a known alignment film material by a known method. No rubbing was made. A liquid crystal material having negative dielectric anisotropy ($\Delta n$: 0.1 and $\Delta \epsilon$: −4.5) was used. In this example, the thicknesses dt and dr of the liquid crystal layer in the transmission region and the reflection region were set at 4 μm and 2.2 μm, respectively (dr=0.55dt).

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics. The visual angle—contrast characteristics in the transmission display were substantially the same as those shown in FIG. 8. The viewing angle characteristics in the transmission display were roughly symmetric in all directions, the range CR>10 was as large as up to ±80°, and the transmission contrast was as high as 300:1 or more at the front.

As for the characteristics of the reflection display, the spectral reflectance evaluated with a spectral colorimeter (CM2002 from Minolta Co., Ltd.) was about 8.1% (value in terms of the aperture ratio of 100%) with respect to a standard diffuse plate as the reference. The contrast value of the reflection display was 20, which was high compared with the case of the conventional LCD devices.

COMPARATIVE EXAMPLE

In the LCD device shown in FIGS. 11A and 11B, one pixel region was divided into a transmission region, a transmission region and a reflection region in this order using only slits (electrode openings) without placing any wall structure or dielectric protrusions dividing the pixel region. In other words, the pixel region was divided into three using only the action of an electric field generated at the electrode openings during voltage application.

An LCD device having the above construction was fabricated under the same conditions of the liquid crystal layer as those in the above example, and the same panel evaluation as that described above was conducted for this comparative example. As a result, as for the display characteristics such as the contrast, roughly the same characteristics as those of the above example were obtained.

Evaluation

The display roughness, the grayscale response characteristics and the display quality after panel pressing were compared between the LCD devices of the above example and comparative example. The roughness in display of a grayscale level (level 2 in eight levels of grayscale) observed in an oblique direction was visually evaluated. As a result, while no roughness was recognized in the example of the present invention, roughness was recognized in the display of the grayscale level at a slanting visual angle in the LCD device of the comparative example using only slits for pixel division.

The LCD devices were observed with an optical microscope of which the polarizing axes were set orthogonal to each other. As a result, while axisymmetrically aligned domains of which the center axes were in position uniformly in the example of the present invention, there were some liquid crystal domains of which the center axes were deviated from the center positions (openings) of the sub-pixel regions in the comparative example. This variation in the position of the center axis was confirmed to be a main cause of the roughness.

The grayscale response time (time required for a change from level 3 to level 5 in the eight levels of grayscale) was 38 msec in the example of the present invention and 65 msec in the comparative example. It was therefore confirmed that the response time in grayscale display could be shortened in the LCD device of the present invention in which the pixel region was divided with the wall structure and the dielectric protrusions. Recovery of the alignment after the display panel was pressed with a fingertip during application of 4V (white display) was examined. As a result, while an afterimage was hardly observed on the pressed portion (the alignment was immediately recovered) in the example of the present invention, an afterimage was recognized for several minutes in the comparative example. A difference was therefore recognized in the recovery from occurrence of an alignment disturbance with pressing. Further, in the comparative example, it was confirmed that part of the disturbed alignment with pressing failed to completely recover and caused display roughness and display failure due to defective alignment.

From the evaluation results described above, it was found that by arranging the transmission region and the reflection region alternately and separating the liquid crystal regions from each other with the dielectric protrusions and the wall structure, obtained were the effect of fixing or stabilizing the positions of the center axes of the axisymmetrically aligned domains, and the effects such as reducing the roughness in grayscale display at a slanting visual angle, increasing the response speed in grayscale display, and reducing occurrence of an afterimage with pressing. In other words, according to the LCD device of this embodiment of the present invention, the division structure in each pixel can be optimized.

In the above embodiment, both the dielectric protrusions and the wall structure were formed. The pixel region can be divided into a plurality of sub-pixel regions as long as at least the dielectric protrusions are formed. Liquid crystal molecules tilt near the side steps of the dielectric protrusions, and this leads to division alignment of liquid crystal molecules in the divided regions. Since the pixel region is divided (partitioned), the division alignment can be obtained without existence of a wall structure. To further stabilize the division alignment and improve the recovery against pressing and other features further effectively, a wall structure and openings are preferably formed. If no wall structure is formed, openings are preferably formed in at least one of the upper and lower electrodes.

As described above, according to the present invention, an LCD device with excellent display quality can be implemented with a comparatively simple construction. The present invention is suitably applied to transmissive LCD devices and transflective (transmissive/reflective) LCD devices. In particular, transflective LCD devices are suitably used as display devices for mobile equipment such as mobile phones.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Applications No. 2004-066292 filed in Japan on Mar. 9, 2004 and No. 2004-084404 filed in Japan on Mar. 23, 2004, the entire contents of which are hereby incorporated by reference.

What is claimed is:

1. A liquid crystal display device comprising a first substrate, a second substrate opposed to the first substrate, and a vertically aligned liquid crystal layer interposed between the first substrate and the second substrate,
    wherein the liquid crystal display device has a plurality of pixels, each pixel including a first electrode formed on the first substrate, a second electrode formed on the second substrate, and the liquid crystal layer interposed between the first electrode and the second electrode, and a shading region provided around the plurality of pixels,
    a plurality of supports for defining the thickness of the liquid crystal layer are placed regularly on a surface of the first substrate or the second substrate facing the liquid crystal layer in the shading region, and
    the liquid crystal layer forms at least one liquid crystal domain exhibiting axisymmetric alignment when at least a predetermined voltage is applied, and the tilt direction of liquid crystal molecules in the at least one liquid crystal domain is defined with inclined sides of the plurality of supports, and wherein each of the at least one liquid crystal domain is in contact with the inclined sides of at least four supports.

2. The device of claim 1, wherein the first electrode has at least one opening, and the center axis of each of the at least one liquid crystal domain is formed in or near the at least one opening.

3. The device of claim 1, wherein the inclined sides of the plurality of supports are inclined in an inversely tapered shape with respect to the first substrate.

4. The device of claim 1, wherein the shape of the plurality of supports in the plane parallel to the first substrate is roughly a circle, an ellipse, a diamond or a cross.

5. The device of claim 1, further comprising a wall structure regularly arranged in the shading region.

6. The device of claim 1, wherein the at least one liquid crystal domain includes two liquid crystal domains, the at least one opening includes two openings, and the center axes of the axisymmetric alignment of the two liquid crystal domains are formed in or near the two openings.

7. The device of claim 1, wherein the first electrode includes a transparent electrode defining a transmission region and a reflective electrode defining a reflection region.

8. The device of claim 7, wherein the at least one liquid crystal domain includes a liquid crystal domain formed in the transmission region and a liquid crystal domain formed in the reflection region.

9. The device of claim 8, wherein the at least one opening includes an opening formed in the transparent electrode and an opening formed in the reflective electrode.

10. The device of claim 1, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

11. The device of claim 1, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

* * * * *